(12) United States Patent
Barbosa et al.

(10) Patent No.: US 11,679,979 B2
(45) Date of Patent: Jun. 20, 2023

(54) SYSTEMS AND METHODS FOR PRODUCTION OF XENON-133

(71) Applicant: Curium US LLC, St. Louis, MO (US)

(72) Inventors: Luis Antonio M. M. Barbosa, Bergen (NL); Sven V. Gerritsen, Alkmaar (NL); Martinus J. A. Schackmann, Heiloo (NL); Paul A. Gronland, Bergen (NL); Brian Hierholzer, Lake St. Louis, MO (US)

(73) Assignee: Curium US LLC, St. Louis, MO (US)

( * ) Notice: Subject to any disclaimer, the term of this patent is extended or adjusted under 35 U.S.C. 154(b) by 1076 days.

(21) Appl. No.: 16/405,703

(22) Filed: May 7, 2019

(65) Prior Publication Data

US 2020/0024139 A1   Jan. 23, 2020

Related U.S. Application Data

(60) Provisional application No. 62/668,688, filed on May 8, 2018.

(51) Int. Cl.
*B01D 53/02* (2006.01)
*C01B 23/00* (2006.01)

(52) U.S. Cl.
CPC ................... *C01B 23/0063* (2013.01)

(58) Field of Classification Search
CPC .... C01B 2210/0037; C01B 2210/0084; C01B 23/0063; F25J 2205/20; G21G 1/001; G21G 2001/0094; Y02C 20/40
See application file for complete search history.

(56) References Cited

U.S. PATENT DOCUMENTS

| | | | |
|---|---|---|---|
| 2,698,523 A | 1/1955 | Hnilicka | |
| 4,054,427 A * | 10/1977 | Schroeter | B01D 53/02 95/127 |
| 4,080,429 A * | 3/1978 | Koeppe | F25J 3/0685 423/220 |
| 4,129,476 A | 12/1978 | Sammarone | |

(Continued)

FOREIGN PATENT DOCUMENTS

| | | |
|---|---|---|
| BE | 903543 A | 2/1986 |
| BE | 1023802 B1 | 7/2017 |

(Continued)

OTHER PUBLICATIONS

European Office Action issued in European Application No. 19 769 256.9-1212, dated Oct. 6, 2021, 3 pages.

(Continued)

*Primary Examiner* — Christopher P Jones
(74) *Attorney, Agent, or Firm* — Armstrong Teasdale LLP

(57) ABSTRACT

Methods and systems for producing Xenon-133 are disclosed. A method for producing Xenon-133 includes collecting an off gas from a Molybdenum-99 production process in a storage tank. The off gas includes Xenon-133 and Krypton-85. The method further includes selectively adsorbing Xenon-133 from the off gas onto a charcoal column assembly such that Xenon-133 is selectively adsorbed onto the charcoal column assembly relative to Krypton-85. The method further includes desorbing the Xenon-133 from the charcoal column assembly by heating the charcoal column assembly, and condensing the Xenon-133 within a coil assembly.

18 Claims, 26 Drawing Sheets

(56) References Cited

U.S. PATENT DOCUMENTS

| | | | |
|---|---|---|---|
| 4,270,938 A | 6/1981 | Schmidt |
| 5,294,422 A | 3/1994 | Kitahara |

FOREIGN PATENT DOCUMENTS

| | | |
|---|---|---|
| CN | 101547857 | 3/2012 |
| CN | 102489108 B | 6/2012 |
| DE | 3221469 A1 | 12/1983 |
| DE | 3221469 C2 | 12/1983 |
| EP | 32949 A | 8/1981 |
| GB | 848199 A | 9/1960 |
| GB | 955345 A | 4/1964 |
| GB | 1406379 A | 9/1975 |
| GB | 1473276 A1 | 5/1977 |
| GB | 1525686 A | 9/1978 |
| JP | 4145921 A | 5/1992 |
| JP | 7139876 A | 6/1995 |
| JP | 9002808 A | 1/1997 |
| JP | 2001270708 A | 10/2001 |
| JP | 2010076972 A | 4/2010 |
| JP | 2011096530 A | 5/2011 |
| JP | 2014215258 A | 11/2014 |
| KR | 100501423 B1 | 7/2005 |
| KR | 2014132617 B1 | 11/2014 |
| KR | 2016109446 A | 9/2016 |
| RU | 2102120 A | 1/1998 |
| RU | 2242422 C1 | 12/2004 |
| RU | 2259522 C1 | 8/2005 |
| SG | 152725 C1 | 12/2011 |
| WO | 2010021127 B | 2/2010 |
| WO | 2011030514 A1 | 3/2011 |
| WO | 2018002161 A1 | 1/2018 |

OTHER PUBLICATIONS

Salacz, J., Reporcessing of irradiated Uranium 235 for the production of Mo-99, I-131, Xe-133 radioisotopes, Institut National des Radioeiements, Jan. 1, 1985, pp. 1-8, vol. 9, No. 3.
International Search Report and Written Opinion regarding PCT/US2019/031144 dated Jan. 24, 2020, pp. 1-21.
An, J. S., et al., 1998. Radio-xenon monitoring technology for CTBT verification. Report No. KAERI/AR—489/98. Korea Atomic Energy Research Institute. Taejon, Republic of Korea.
Bowyer, T. W., et al., 1996 Automatic Radioxenon Analyzer for CTBT Monitoring. Report No. PNNL-11424. Pacific Northwest National Laboratory, Richland, Washington.
Momyer, F. F., 1960. The Radiochemistry of the Rare Gases. Nuclear Science Series NAS-NS 3025. National Academy of Sciences National Research Council. Washington, DC.

\* cited by examiner

SYSTEMS AND METHODS FOR PRODUCTION OF XENON-133

CROSS-REFERENCE TO RELATED APPLICATIONS

This application claims priority to U.S. Provisional Patent Application Ser. No. 62/668,688, filed on May 8, 2018, the disclosure of which is hereby incorporated by reference in its entirety.

FIELD

The field of the disclosure relates generally to production of radioactive isotopes and, more particularly, to systems and methods for producing Xenon-133.

BACKGROUND

Radioactive isotopes are used in nuclear medicine for diagnostic and therapeutic purposes. Xenon-133 ("Xe-133") is one such isotope, used as an inhalation diagnostic agent. In at least some radioisotope production processes, such as Molybdenum-99 ("Mo-99") production processes, Xe-133 is produced as a by-product. For example, during production of Mo-99, enriched uranium targets are irradiated to produce various fission products including, among others, Mo-99, Xe-133, Iodine-131, and Krypton-85 ("Kr-85"). Previous methods and techniques for producing and purifying Xe-133 are not satisfactory for isolating and purifying Xe-133 from other off gasses produced during the Mo-99 production process, such that Xe-133 is typically discarded in conventional Mo-99 production processes. Accordingly, a need exists for systems and methods for separating and purifying Xe-133 from the off gas generated during dissolution of irradiated enriched uranium targets.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a method for producing Xenon-133 includes collecting an off gas from a Molybdenum-99 production process in a storage tank. The off gas includes Xenon-133 and Krypton-85. The method further includes selectively adsorbing Xenon-133 from the off gas onto a charcoal column assembly such that Xenon-133 is selectively adsorbed onto the charcoal column assembly relative to Krypton-85. The method further includes desorbing the Xenon-133 from the charcoal column assembly by heating the charcoal column assembly, and condensing the Xenon-133 within a coil assembly.

In another aspect, a method for producing Xenon-133 includes collecting an off gas from a Molybdenum-99 production process in a storage tank. The off gas includes Xenon-133 and Krypton-85. The method further includes directing the off gas through a cooled charcoal column assembly such that Xenon-133 is selectively adsorbed onto the charcoal column assembly relative to Krypton-85. The method further includes heating the charcoal column assembly to a sufficient temperature to desorb the Xenon-133 from the charcoal column assembly, flowing a carrier gas through the heated charcoal column assembly such that the Xenon-133 is desorbed from the charcoal column assembly, and directing the carrier gas and the desorbed Xenon-133 through a cooled coil assembly such that the Xenon-133 condenses within the coil assembly.

In yet another aspect, a method of selectively adsorbing Xenon-133 onto a charcoal column assembly includes fluidly connecting an inlet of the charcoal column assembly to a storage tank containing an off gas from a Molybdenum-99 production process. The off gas includes Xenon-133 and Krypton-85. The method further includes cooling the charcoal column assembly to a temperature in the range of $-5°$ C. to $10°$ C., and directing the off gas through the cooled charcoal column assembly such that Xenon-133 is selectively adsorbed onto the charcoal column assembly relative to Krypton-85.

In still another aspect, a method of collecting Xenon-133 within a coil assembly includes cooling the coil assembly to a temperature less than $-150°$ C., fluidly connecting an inlet of the coil assembly to a charcoal column assembly containing Xenon-133, receiving a heated gas flow from the charcoal column assembly through the inlet of the coil assembly, and directing the heated gas flow through the coil assembly such that Xenon-133 condenses within the coil assembly.

In yet another aspect, a system for producing Xenon-133 from an off gas produced during a Molybdenum-99 production process includes at least one nuclear radiation shielded enclosure, a storage tank for containing the off gas from the Molybdenum-99 production process, a charcoal column assembly within the at least one nuclear radiation shielded enclosure, a heating and cooling system in thermal communication with the charcoal column assembly, and a coil assembly positioned within the at least one nuclear radiation shielded enclosure. The charcoal column assembly is selectively connectable to the storage tank to receive the off gas therefrom. The heating and cooling system is operable to cool the charcoal column assembly during a selective adsorption step, and heat the charcoal column assembly during a desorption step. The coil assembly is selectively connectable to the charcoal column assembly to receive a heated gas flow containing Xenon-133 from the charcoal column assembly.

In still another aspect, a coil assembly for separation of Xenon-133 from an off gas stream generated during a Molybdenum-99 production process includes a coil flange having a first side and a second side, and defining a flange inlet and a flange outlet. The coil assembly further includes a coil positioned on the first side of the coil flange. The coil includes an inlet portion, an outlet portion, and a helical portion having a double-helix configuration. The helical portion has a top positioned a first distance from the first side of the coil flange. The inlet portion extends through the flange inlet, and the outlet portion extends through the flange outlet. The helical portion is fluidly connected to the inlet portion and the outlet portion. The coil assembly further includes a fluid control assembly attached to the second side of the coil flange. The fluid control assembly includes an inlet assembly and an outlet assembly. The inlet portion is fluidly connected to the inlet assembly, and the outlet portion is fluidly connected to the outlet assembly.

In another aspect, a charcoal column assembly for separation of Xenon-133 from an off gas stream generated during a Molybdenum-99 production process includes a charcoal column and a column flange having a first side and a second side, and defining a flange inlet and a flange outlet. The charcoal column is positioned on a first side of the column flange, and has a volume of charcoal therein. The charcoal column also has a top and a bottom. The charcoal column assembly further includes a fluid control assembly attached to the second side of the column flange. The fluid control assembly includes an inlet assembly and an outlet assembly. The top of the charcoal column is fluidly connected to the inlet assembly through the flange inlet. The charcoal column assembly further includes an outlet tube fluidly connected to the bottom of the charcoal column and to the outlet assembly through the flange outlet.

In yet another aspect, a transportation vessel for transportation of Xenon-133 includes a coil assembly, a first nuclear radiation shield, and a second nuclear radiation shield. The coil assembly includes a coil flange having a first side and a second side, and defining a flange inlet and a flange outlet. The coil assembly further includes a coil positioned on the first side of the coil flange. The coil includes an inlet portion, an outlet portion, and a helical portion having a double-helix configuration. The helical portion has a top positioned a first distance from the first side of the coil flange. The inlet portion extends through the flange inlet, and the outlet portion extends through the flange outlet. The helical portion is fluidly connected to the inlet portion and the outlet portion. The coil assembly further includes a fluid control assembly attached to the second side of the coil flange. The fluid control assembly includes an inlet assembly and an outlet assembly. The inlet portion is fluidly connected to the inlet assembly, and the outlet portion is fluidly connected to the outlet assembly. The first nuclear radiation shield is removably attached to the first side of the coil flange, and defines a first shield cavity. The coil assembly is positioned within the first shield cavity. The second nuclear radiation shield is removably attached to the second side of the coil flange, and defines a second shield cavity. The fluid control assembly is positioned within the second shield cavity. The first and second shields completely enclose the coil assembly.

In still another aspect, a transportation vessel for transportation of Xenon-133 includes a charcoal column assembly, a first nuclear radiation shield, and a second nuclear radiation shield. The charcoal column assembly includes a charcoal column having a volume of charcoal therein. The charcoal column also has a top and a bottom. The charcoal column assembly further includes a column flange having a first side and a second side. The column flange defines a flange inlet and a flange outlet. The charcoal column is positioned on a first side of the column flange. The charcoal column assembly further includes a fluid control assembly attached to the second side of the column flange. The fluid control assembly includes an inlet assembly and an outlet assembly. The top of the charcoal column is fluidly connected to the inlet assembly through the flange inlet. The charcoal column assembly further includes an outlet tube fluidly connected to the bottom of the charcoal column and to the outlet assembly through the flange outlet. The first nuclear radiation shield is removably attached to the first side of the column flange, and defines a first shield cavity. The column assembly is positioned within the first shield cavity. The second nuclear radiation shield is removably attached to the second side of the column flange, and defines a second shield cavity. The fluid control assembly is positioned within the second shield cavity. The first and second shields completely enclose the column assembly.

In yet another aspect, a glovebox for production of Xenon-133 from an off gas stream generated during a Molybdenum-99 production process includes a plurality of nuclear radiation shields that define a shielded processing space. At least one of the shields defines a coil assembly receptacle and a column assembly receptacle. The glovebox further includes a coil assembly removably positioned within the coil assembly receptacle, and a column assembly removably positioned within the column assembly receptacle. The coil assembly includes a coil flange having a first side and a second side, and defining a flange inlet and a flange outlet. The coil assembly further includes a coil positioned on the first side of the coil flange. The coil includes an inlet portion, an outlet portion, and a helical portion having a double-helix configuration. The helical portion has a top positioned a first distance from the first side of the coil flange. The inlet portion extends through the flange inlet, and the outlet portion extends through the flange outlet. The helical portion is fluidly connected to the inlet portion and the outlet portion. The coil assembly further includes a fluid control assembly attached to the second side of the coil flange. The fluid control assembly includes an inlet assembly and an outlet assembly. The inlet portion is fluidly connected to the inlet assembly and the outlet portion is fluidly connected to the outlet assembly. The column assembly includes a charcoal column having a volume of charcoal therein. The charcoal column also has a top and a bottom. The column assembly includes a column flange having a first side and a second side. The column flange defines a flange inlet and a flange outlet. The charcoal column is positioned on a first side of the column flange. The column assembly further includes a fluid control assembly attached to the second side of the column flange. The fluid control assembly includes an inlet assembly and an outlet assembly. The top of the charcoal column is fluidly connected to the inlet assembly through the flange inlet. The column assembly further includes an outlet tube fluidly connected to the bottom of the charcoal column and to the outlet assembly through the flange outlet.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 21 is a top view of the example coil assembly shown in

FIG. 19.

Corresponding reference characters indicate corresponding parts throughout the several views of the drawings.

DETAILED DESCRIPTION

Figure 1:
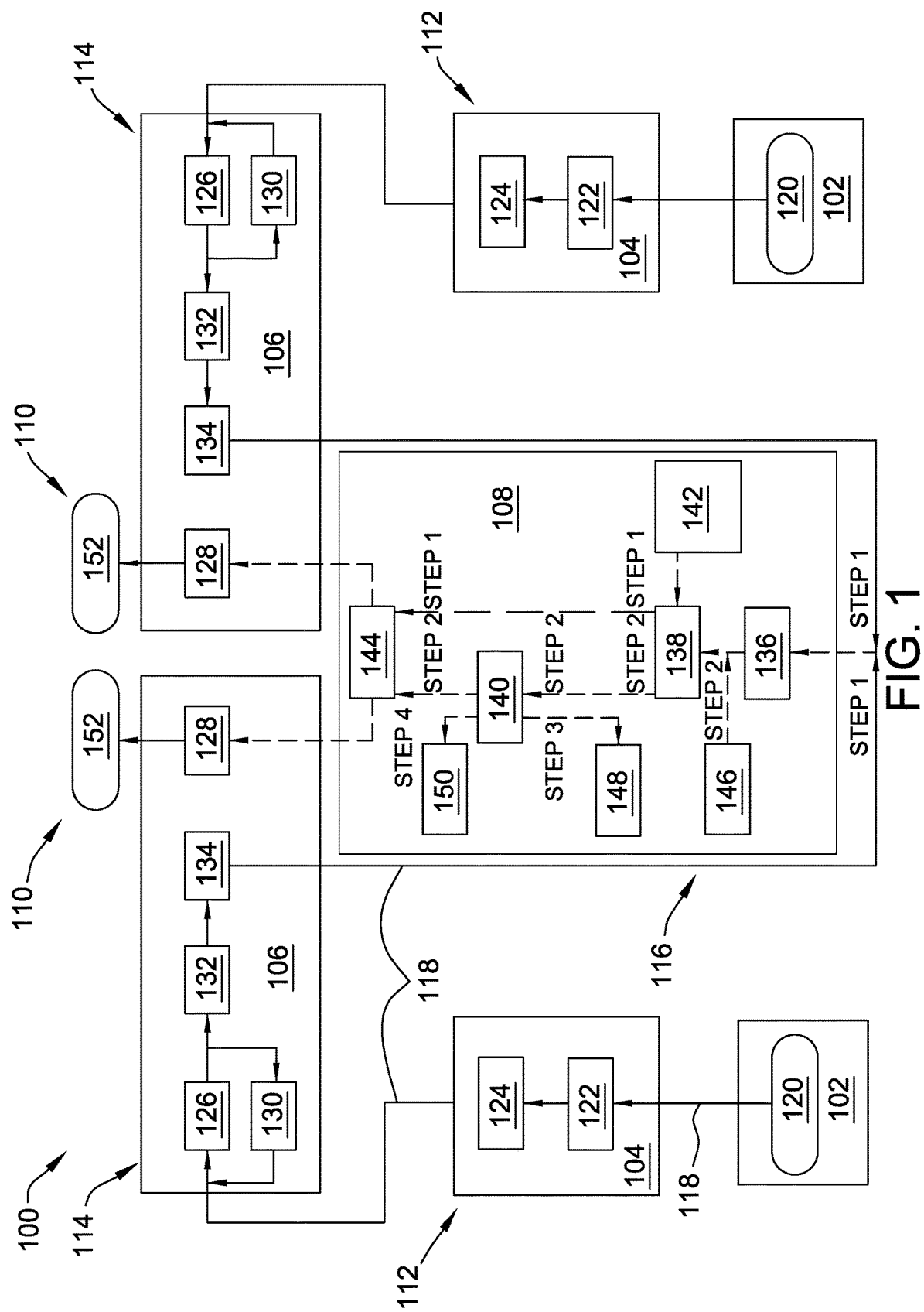
FIG. 1 is a schematic view of an example system for producing Xe-133.

The present disclosure is generally directed to the production of radioactive isotopes and, more particularly, to systems and methods for producing Xenon-133 ("Xe-133"). Radioactive isotopes are used, for example, in nuclear medicine for diagnostic and therapeutic purposes by introducing a small dose of the radioactive material into a patient. Among other possible uses, the isotope Xe-133 is a suitable inhalation diagnostic agent that is used to help diagnose lung diseases and to check blood flow in the brain.

Xe-133 is one fission product among over 300 other nuclides produced during the thermal neutron induced fission of Uranium-235 ("U-235"). Xe-133 is commonly produced as a by-product of other radionuclide production processes, such as Mo-99. In previous Mo-99 production processes, Xe-133 was disposed of or discarded. Systems and methods of the present disclosure facilitate production of Xe-133 from an off gas produced by dissolution of enriched Uranium targets. Particular embodiments of the present disclosure provide systems and methods for isolating and purifying Xe-133 from a Mo-99 production process in which low-enriched Uranium (LEU) targets are irradiated. Although systems and methods are described herein as suitable for use with LEU, embodiments of the present disclosure are not limited to use with LEU and may be used with other forms of enriched Uranium, such as highly enriched Uranium (HEU). As compared to previous Xe-133 production systems and methods, embodiments of the systems and methods described herein provide improved yield of Xe-133 from off gases, enabling production of Xe-133 from raw gases having an initially lower concentration of Xe-133 (e.g., from irradiated LEU).

In an example method, bombarded uranium targets, such as LEU targets, are processed by dissolving the targets in alkaline or acid media to release fission products. The off gas (i.e., all fission gasses) produced by dissolution of the LEU targets is collected in a gas tank. During dissolution of the uranium targets in a Mo-99 production process, Xe-133 is released from the metallic matrix, removed from the process, and stored in the gas tank. Other gasses are also released from the target dissolution, such as Hydrogen ($H_2$), water vapor ($H_2O$), nitrogen gas ($N_2$), and carbon dioxide ($CO_2$), as well as other radioactive fission gasses, such as other Xe isotopes (e.g., Xe-135) and Krypton (Kr) isotopes (e.g., Kr-85). These gasses, along with a process carrier gas, such as Helium (He), are stored in the same gas tank(s) as the Xe-133. This gas mixture is the "off gas" produced during dissolution of enriched Uranium targets (i.e., during the Mo-99 production process), and may be interchangeably referred to as the "raw Xe gas". Thus, the off gas includes the radioactive isotopes Xe-133 and Kr-85, among others, as well as other, non-radioactive gases, such as Hydrogen ($H_2$), Helium (He), water vapor ($H_2O$), nitrogen gas ($N_2$), and carbon dioxide ($CO_2$).

In some embodiments, the off gas is collected in one or more vacuum tanks. The vacuum tank may have any suitable volume that enables the methods to be carried out as described herein. In some embodiments, the vacuum tank has a volume in the range of 50 liters (L) to 500 L, 100 L to 400 L, 200 L to 450 L, 300 L to 550 L, 100 L to 200 L, 200 L to 300 L, 300 L to 400 L, and 400 L to 500 L. Further, in some embodiments, the off gas is allowed to cool within the gas tank(s) for a period of at least 24 hours following the end of irradiation (EOI) of the Uranium targets. In some embodiments, the off gas is allowed to cool within the gas tank(s) for a period of up to 36 hours, up to 48 hours, up to 60 hours, or up to 72 hours.

The off gas is then processed to purify and concentrate Xe-133 gas. The example method includes selectively adsorbing Xe-133 from the off gas onto a charcoal column assembly such that Xe-133 is preferentially or selectively adsorbed onto the charcoal column assembly relative to Kr-85, desorbing the Xe-133 from the charcoal column assembly, and condensing the desorbed Xe-133 within a cooled coil assembly.

To selectively adsorb Xe-133 from the off gas onto a charcoal column assembly, the charcoal column assembly is cooled to a temperature at which Xe-133 is preferentially adsorbed onto an activated charcoal material within the charcoal column assembly, and at which the carrier gas (e.g., He) and Krypton isotopes (e.g., Kr-85) are not measurably adsorbed. In some embodiments, the charcoal column assembly is cooled to a temperature in the range of −10° C. to 10° C., −10° C. to 5° C., −5° C. to 10° C., −5° C. to 5°

C., 0° C. to 10° C., or 0° C. to 6° C. Once the charcoal column assembly is cooled to the desired temperature, the off gas is directed through the cooled charcoal column assembly such that Xe-133 is preferentially or selectively adsorbed on to the activated charcoal material. Gases not adsorbed onto the activated charcoal material (e.g., Kr-85 and He) pass through the charcoal column assembly and are directed to post-processing and air cleaning systems (e.g., gas delay filters) for disposal. Activated charcoal materials suitable for use in the charcoal column assemblies described herein include, for example and without limitation, chromatographic grade activated charcoal, such as activated charcoal Norit® RB1, sold by Cabot Corporation.

In some embodiments, the activated charcoal may be pre-treated or pre-processed to facilitate maximizing the yield of Xe-133 during the adsorption step. For example, the activated charcoal may be subjected to a vacuum drying process prior to the adsorption step. Additionally or alternatively, the activated charcoal may be heated and subjected to a flow of inert gas (e.g., He) for a period of between 2 hours and 16 hours, between 4 hours and 12 hours, or between 4 hours and 8 hours. The activated charcoal may be heated to a temperature of between 50° C. and 120° C., between 60° C. and 100° C., or between 70° C. and 90° C. while subjected to the inert gas flow.

During the adsorption process, the flow of off gas through the charcoal column assembly may be regulated with suitable flow regulating devices (e.g., vacuum pumps, flow controllers, valves, etc.) to achieve target flow rates, gas velocities, and/or pressures. In some embodiments, for example, the off gas is directed through the cooled charcoal column assembly at a target flow rate while the charcoal column assembly is held at a cooled temperature, such as within one of the temperature ranges described above. The target flow rate may generally be any suitable flow rate that enables the Xe-133 production methods to be carried out as described herein, and may be selected or based on, for example, the temperature of the charcoal column assembly during the adsorption process, the physical dimensions of the charcoal column assembly (e.g., length and cross-sectional area), and the Xe-133 concentration (absolute or relative) of the off gas. In some embodiments, the target flow rate is in the range of 1.0 normal liters per minute (NL/min) to 2.0 NL/min, 1.0 NL/min to 1.6 NL/min, 1.2 NL/min to 1.8 NL/min, 1.4 NL/min to 2.0 NL/min, 1.1 NL/min to 1.5 NL/min, 1.3 NL/min to 1.7 NL/min, 1.5 NL/min to 1.9 NL/min, and 1.35 NL/min to 1.65 NL/min.

Further, in some embodiments, the off gas is directed through the cooled charcoal column assembly at a target flow velocity while the charcoal column assembly is held at a cooled temperature, such as within one of the temperature ranges described above. The target flow velocity may generally be any suitable flow velocity that enables the Xe-133 production methods to be carried out as described herein, and may be selected or based on, for example, the temperature of the charcoal column assembly during the adsorption process, the physical dimensions of the charcoal column assembly (e.g., length and cross-sectional area), and the Xe-133 concentration (absolute or relative) of the off gas. In some embodiments, the target flow velocity is in the range of 3 centimeters per second (cm/s) to 14 cm/s, 3 cm/s to 12 cm/s, 5 cm/s to 14 cm/s, 3 cm/s to 10 cm/s, 5 cm/s to 10 cm/s, 7 cm/s to 14 cm/s, 5 cm/s to 8 cm/s, 6 cm/s to 9 cm/s, and 7 cm/s to 10 cm/s.

Following the adsorption process, the charcoal column assembly contains primarily Xenon isotopes. The relative amount of Xe-133 adsorbed onto the charcoal column assembly depends on the amount of time between the end of irradiation of the uranium targets and the end of adsorption. Xenon isotopes that may be present during the adsorption process include, for example and without limitation: Xe-128 (inactive), Xe-129 (inactive), Xe-129m (active), Xe-130 (inactive), Xe-131 (inactive), Xe-131m (active), Xe-132 (inactive), Xe-133 (active), Xe-133m (active), Xe-134 (inactive), Xe-135m (active), Xe-135 (active), and Xe-136 (inactive).

In the example method, after the Xe-133 is adsorbed onto the charcoal column assembly, the charcoal column assembly is disconnected from the off gas supply line and heated to a temperature at which the Xe-133 will desorb from the charcoal column assembly. Suitable temperatures to which the charcoal column assembly may be heated for the desorption process include, for example and without limitation, at least 60° C., at least 65° C., at least 70° C., at least 75° C., at least 80° C., at least 85° C., at least 90° C., and up to 120° C. In some embodiments, the charcoal column assembly is sealed after the adsorption process and prior to heating to inhibit the escape of Xe-133 from the charcoal column assembly.

In the example method, once the charcoal column assembly is heated to the target temperature, an inlet of the charcoal column assembly is connected to a carrier gas supply line (e.g., He), and an outlet of the charcoal column assembly is connected to a cooled Xe-133 collection device. In the example method, the Xe-133 collection device includes a helical coil assembly cooled to a suitable temperature at which Xe-133 gas condenses and/or crystallizes within the coil assembly when passed through the coil assembly. Suitable temperatures to which the coil assembly may be cooled during the desorption process include, for example and without limitation, less than −100° C., less than −125° C., less than −150° C., less than −170° C., less than −180° C., less than −190° C., less than −195° C., and down to −200° C.

In the example method, once the coil assembly is cooled to the desired temperature, the outlet of the charcoal column assembly is connected to an inlet of the coil assembly, and a carrier gas (e.g., He) is flowed through the heated charcoal column assembly such that Xe-133 is desorbed from the charcoal column assembly and entrained in the carrier gas flow, and passed through the cooled coil assembly. As the carrier gas and Xe-133 flow through the cooled coil assembly, Xe-133 condenses and/or crystallizes on the interior walls of the coil assembly. The carrier gas is selected to have a boiling point and freezing point lower than the respective boiling point and freezing point of Xe-133 such that the carrier gas (e.g., He) passes through the cooled coil assembly without condensing and/or crystallizing. Trace amounts of Kr-85 remaining in the carrier gas flow (e.g., from being adsorbed and desorbed from the charcoal column assembly) similarly pass through the cooled coil assembly without significant condensation and/or crystallization because Kr-85 has a lower boiling point and freezing point than the respective boiling point and freezing point of Xe-133. Gases not condensed or crystallized within the coil assembly (e.g., Kr-85 and He) pass through the coil assembly and are directed to post-processing and air cleaning systems (e.g., gas delay filters) for disposal.

During the desorption process, the flow of off gas through the charcoal column assembly and the coil assembly may be regulated with suitable flow regulating devices (e.g., vacuum pumps, flow controllers, valves, etc.) to achieve target flow rates, gas velocities, and/or pressures. In some embodiments, for example, the carrier gas is directed through the charcoal column assembly and the coil assembly at a target flow rate while the column assembly is held at a heated temperature, such as within one of the temperature ranges described above, and while the coil assembly is held at a cooled temperature, such as within one of the temperature ranges described above. The target flow rate may generally be any suitable flow rate that enables the Xe-133 production methods to be carried out as described herein, and may be selected or based on, for example, the temperatures of the charcoal column assembly and the coil assembly during the desorption process, the physical dimensions of the charcoal column assembly and the coil assembly (e.g., length and cross-sectional area), and the Xe-133 concentration (absolute or relative) within the carrier gas. In some embodiments, the target flow rate is in the range of 50 normal-milliliters per minute (NmL/min) to 250 NmL/min, 80 NmL/min to 200 NmL/min, 120 NmL/min to 250 NmL/min, 100 NmL/min to 180 NmL/min, 120 NmL/min to 200 NmL/min, 120 NmL/min to 160 NmL/min, 140 NmL/min to 180 NmL/min, 160 NmL/min to 200 NmL/min, and 150 NmL/min to 170 NmL/min.

In the example method, the desorption process is carried out for a suitable amount of time to desorb substantially all of Xe-133 from the charcoal column assembly. The length of the desorption process may vary, for example, based on the temperatures of the charcoal column assembly and the coil assembly and the flow rate of carrier gas during the desorption step. In some embodiments, the carrier gas is flowed through the charcoal column assembly and the coil assembly during the desorption step for a period of at least 20 minutes, at least 30 minutes, at least 40 minutes, at least 50 minutes, at least 60 minutes, at least 70 minutes, at least 80 minutes, at least 90 minutes, and up to 120 minutes. In other embodiments, the desorption step may be performed for any suitable amount of time that enables the Xe-133 production methods to be carried out as described herein.

The example method further includes evacuating the coil assembly after the Xe-133 is condensed and/or crystallized within the coil to limit the internal pressure of the coil assembly resulting from evaporation of Xe-133 as the coil assembly is allowed to reach ambient temperature. In some embodiments, the coil is evacuated while the coil is held at a cooled temperature, such as within the temperature ranges described above, and/or while the Xe-133 is condensed and/or crystallized within the coil assembly (i.e., prior to the Xe-133 evaporating). Further, in some embodiments, the coil assembly is evacuated such that the pressure within the coil assembly is less than 500 milliBar (mBar), less than 450 mBar, less than 400 mBar, less than 350 mBar, less than 300 mBar, less than 250 mBar, less than 200 mBar, or less than 150 mBar, before the coil assembly is allowed to reach ambient temperature. Further, in some embodiments, the coil assembly is evacuated such that the pressure within the coil assembly at a temperature of 55° C. is less than 2.5 Bar, less than 2.0 Bar, less than 1.5 Bar, less than 1.25 Bar, and less than 1.0 Bar.

In some embodiments, the coil assembly is evacuated by sealing the inlet of the coil assembly and connecting the outlet of the coil assembly to a vacuum source including, for example and without limitation, a vacuum pump or one or more evacuated containers. Further, in some embodiments, the flow rate of gas during the evacuation process is controlled to reduce or prevent evaporation and removal of Xe-133 gas from the coil assembly. In some embodiments, for example, a flow restrictor is fluidly connected to the coil assembly to limit the flow rate of gas out of the coil assembly during the evacuation process. In some embodiments, the flow restrictor is connected between the outlet of the coil assembly and the vacuum source. The flow restrictor may include, for example and without limitation, a restrictor orifice and a needle valve (e.g., a low flow metering valve).

Additionally, in some embodiments, the evacuation process is carried out in multiple steps or phases. In one embodiment, for example, the cooled coil assembly is connected to a first evacuated container, and the internal pressure of the coil assembly is allowed to reach equilibrium with the evacuated container. The coil assembly is then disconnected from the first evacuated container and sealed. A second evacuated container is then connected to the coil assembly, and the internal pressure of the coil assembly is allowed to reach equilibrium with the second evacuated container. The initial pressure within the evacuated containers may be less than 500 mBar, less than 400 mBar, less than 300 mBar, less than 200 mBar, and less than 100 Bar. In some embodiments, the initial pressure of the evacuated container and the flow rate of gas during the evacuation process are set such that the internal pressure within the coil assembly reaches equilibrium with the evacuated containers within 2 to 10 minutes, within 2 to 7 minutes, within 3 to 8 minutes, within 3 to 6 minutes, within 4 to 7 minutes, or within about 5 minutes.

In the example method, after the evacuation step is complete, the inlet and outlet of the coil assembly are sealed, and the coil assembly is allowed to reach ambient temperature such that condensed Xe-133 within the coil assembly evaporates into gaseous Xe-133 within the coil assembly. The activity of Xe-133 gas may then be measured and/or a sample of the Xe-133 gas may be collected for quality control analysis. The coil containing the Xe-133 API gas will be packed in a secondary transport container, and prepared for shipment.

In some embodiments, the method further includes filtering out or otherwise removing contaminants from the off gas, for example, prior to the selective adsorption step. In some embodiments, for example, the method includes passing the off gas through a series of filters and/or chromatographic columns to filter out and remove particles and contaminants from the off gas. In some embodiments, the method includes removing particles and other contaminants from the off gas prior the selective adsorption step by passing the off gas through a particle filter. Further, in some embodiments, the method includes removing water vapor from the off gas prior the selective adsorption step by passing the off gas through a zeolite column assembly. Additionally, in some embodiments, the method further includes removing carbon dioxide from the off gas prior to the selective adsorption step by passing the off gas through a column assembly containing sodium-hydroxide coated silicon dioxide (e.g., Ascarite® sodium hydroxide-coated silica, sold by MilliporeSigma). Removing gases, such as water vapor and carbon dioxide, from the off gas prior to the adsorption and desorption steps facilitates reducing the pressure within the coil assembly following the desorption step.

The methods described herein may be carried out in one or more nuclear radiation shielded enclosures, such as a hot cell and/or a glove box. The methods may be carried out in a single shielded enclosure or, as described in more detail herein, in multiple shielded enclosures. Further, the different steps of the methods described herein may be carried out in a single location or facility, or may be carried out in multiple locations or facilities. In one embodiment, for example, the adsorption process is carried out at a first location or facility, and the desorption and Xe-133 collection steps are carried out at a second location or facility. In such an embodiment, the loaded charcoal column assembly (i.e., charged with Xe-133) may be transported to a second location or facility were subsequent processing (e.g., desorption and/or Xe-133 collection) is carried out.

With reference now to the figures, an example system 100 for producing Xe-133 is shown schematically in FIG. 1. The system 100 shown in FIG. 1 may be used to produce Xe-133 from a variety of sources (i.e., raw gases). The system 100 of FIG. 1 is particularly suited for producing Xe-133 from an off gas produced during a Mo-99 production process, although the system 100 is not limited to use with only off gas produced during a Mo-99 production process.

As shown in FIG. 1, the system 100 generally includes a plurality of stations. In the example embodiment, the system 100 includes a storage station 102, a filtering station 104, a pump station 106, and a Xenon collection station 108. The system 100 also includes a post-processing and air cleaning system 110 for processing and cleaning gas following the Xe-133 production process. In the illustrated embodiment, the system 100 includes two storage stations 102, two filtering stations 104, and two pump stations 106. Each storage station 102, each filtering station 104, and each pump station 106 has an identical configuration in the illustrated embodiment. In the example embodiment, the Xenon collection station 108 is selectively connectable to the different storage stations 102, filtering stations 104, and pump stations 106 such that a single Xenon collection station 108 can receive and process off gas from multiple Mo-99 production lines.

The filtering station 104, the pump station 106, and the Xenon collection station 108 are enclosed in one more nuclear radiation shielded containment chambers. In the example embodiment, each station is enclosed within a separate containment chamber. In other embodiments, one or more of the filtering station 104, the pump station 106, and the Xenon collection station 108 may be located in the same containment chamber. In the example embodiment, the filtering station 104 is located within a hot cell 112 in which a Mo-99 production process is carried out. Further, the pump station 106 is located in a first glove box 114, and the Xenon collection station 108 is located in a second glove box 116.

Components of the different stations are fluidly connected to one another with suitable fluid conduits 118. Fluid conduits that extend between or connect components between different stations are shielded with suitable nuclear radiation shielding to inhibit release of nuclear radiation in operator-occupied areas.

The storage station 102 includes a storage tank 120 for storing gas and other materials produced during dissolution of irradiated enriched uranium targets. In the example embodiment, the storage tank 120 is fluidly connected to a Mo-99 production process to receive the off gas generated during dissolution of irradiated enriched uranium targets. In some embodiments, the storage tank 120 is a vacuum tank. The storage tank 120 may have any suitable volume that enables the system 100 to function as described herein. In some embodiments, the storage tank 120 has a volume in the range of 50 L to 500 L, 100 L to 400 L, 200 L to 450 L, 300 L to 550 L, 100 L to 200 L, 200 L to 300 L, 300 L to 400 L, and 400 L to 500 L.

The filtering station 104 is connected downstream of the storage station 102 to receive the off gas from the storage tank 120. The filtering station 104 includes a particle filter 122 and a first zeolite column assembly 124. In the illustrated embodiment, the first zeolite column assembly 124 is separate from the particle filter 122, and is connected downstream from the particle filter 122. In other embodiments, the particle filter 122 may be integrated within the first zeolite column assembly 124.

The particle filter 122 includes suitable filtering media to remove inhalable particulates from the off gas stream. The filtering media may include, for example and without limitation, porous sintered metal media (also known as "frits"). The porous sintered metal media may have a porosity of between 0.1 and 10 microns, between 0.1 and 5 microns, between 0.1 and 3 microns, or between 0.1 and 2 microns.

The first zeolite column assembly 124 includes an amount of zeolite to absorb water vapor within the off gas stream. Suitable forms of zeolite for use in the first zeolite column assembly 124 include, for example and without limitation, zeolite type 4A and zeolite type 13X. The first zeolite column assembly 124 may contain any suitable amount of zeolite that enables the system 100 to function as described herein. In some embodiments, the first zeolite column assembly 124 contains a mass of zeolite of between 5 grams (g) and 30 g, between 8 g and 25 g, between 10 g and 30 g, between 10 g and 25 g, between 15 g and 30 g, between 12 g and 20 g, or between 15 g and 20 g.

The pump station 106 includes one or more flow regulating devices for controlling the flow of the off gas through the system 100. In some embodiments, for example, the pump station 106 includes at least one vacuum pump that is connected in fluid communication with the storage tank 120 and a charcoal column assembly 138, and is operable to pump the off gas from the storage tank 120 and through the charcoal column assembly 138.

In the illustrated embodiment, the pump station 106 includes a first vacuum pump 126, a second vacuum pump 128, and a pressure controller 130. The first vacuum pump 126 is connected to the filtering station 104 and in fluid communication between the storage tank 120 and the charcoal column assembly 138. The first vacuum pump 126 is operable to draw or pump off gas from the storage tank 120 through the filtering station 104. The second vacuum pump 128 is fluidly connected downstream of the first vacuum pump 126 and the charcoal column assembly 138 through components of the Xenon collection station 108, and is operable to draw or pump the off gas from the first vacuum pump 126, through components of the Xenon collection station 108 (e.g., the charcoal column assembly 138), and to the post-processing and air cleaning system 110 for disposal. As described further herein, the second vacuum pump 128 is also selectively connectable to an outlet of a coil assembly 140 within the Xe collection station 108 during the desorption step to direct a carrier gas through the charcoal column assembly 138 and the coil assembly 140.

The pressure controller 130 is connected to the first vacuum pump 126 and/or the second vacuum pump 128, and is operable to control or regulate the first vacuum pump 126 and/or the second vacuum pump 128 to maintain a set pressure of the off gas throughout the system 100 during the adsorption process.

In the illustrated embodiment, the pump station 106 further includes a water indicator 132 connected downstream from the first vacuum pump 126, and a second zeolite column assembly 134 connected downstream from the water indicator 132. The water indicator 132 is configured to detect the presence of water, particularly water vapor, within the off gas stream as it flows through the pump station 106. The water indicator 132 is configured to provide a visual and/or audible indicator when water is detected in the off gas stream. The second zeolite column assembly 134 may have the same construction as the first zeolite column assembly 124, and act as a backup or redundant zeolite column assembly to capture any water vapor remaining in the off gas stream after passing through the first zeolite column assembly 124.

The Xenon collection station 108 includes a carbon dioxide ($CO_2$) removal column assembly 136, a charcoal column assembly 138, a coil assembly 140, a heating and cooling system 142, and a flow controller 144. In the illustrated embodiment, the Xenon collection station 108 also includes a carrier gas supply 146, an evacuation device 148, and a sample collection device 150.

The $CO_2$ removal column assembly 136 is connected upstream of the charcoal column assembly 138, and is configured to remove or filter out carbon dioxide from the incoming off gas stream. The $CO_2$ removal column assembly 136 contains a suitable $CO_2$ scavenger or adsorbent including, for example and without limitation, sodium-hydroxide coated silicon dioxide (e.g., Ascarite® sodium hydroxide-coated silica, sold by MilliporeSigma). The $CO_2$ removal column assembly 136 may contain any suitable amount of a $CO_2$ scavenger or adsorbent that enables the system 100 to function as described herein. In some embodiments, the $CO_2$ removal column assembly 136 contains a mass of $CO_2$ scavenger or adsorbent of between 50 g and 200 g, between 60 g and 150 g, between 80 g and 170 g, between 100 g and 170 g, between 70 g and 140 g, between 90 g and 160 g, between 110 g and 180 g, between 90 g and 140 g, between 110 g and 160 g, between 130 g and 180 g, between 110 g and about 140 g, or about 130 g. Removing carbon dioxide from the off gas stream prior to the adsorption step (i.e., upstream of the charcoal column assembly 138) facilities maximizing the yield of Xe-133 during the production process because the presence of carbon dioxide in the off gas stream would otherwise reduce the amount of Xenon adsorbed onto the charcoal column assembly (i.e., reduce the Xenon adsorption capacity of the charcoal column assembly 138). Additionally, removing carbon dioxide from the off gas stream facilitates reducing the pressure within the coil assembly 140 following the desorption step.

The charcoal column assembly 138 is located downstream of the $CO_2$ removal column assembly 136 and the carrier gas supply 146. Further, the charcoal column assembly 138 is selectively connectable to the storage tank 120 (via the $CO_2$ removal column assembly 136) and the carrier gas supply 146 such that the gas supplied to the charcoal column assembly 138 can be changed between the off gas and the carrier gas. The charcoal column assembly 138 includes an activated charcoal material suitable for adsorbing Xe-133. Activated charcoal materials suitable for use in the charcoal column assembly 138 include, for example and without limitation, chromatographic grade activated charcoal, such as activated charcoal Norit® RB1, sold by Cabot Corporation. The charcoal column assembly 138 may contain any suitable amount of activated charcoal that enables the system 100 to function as described herein. In some embodiments, the charcoal column assembly 138 contains a mass of activated charcoal of between 10 g and 100 g, between 10 g and 80 g, between 10 g and 50 g, between 20 g and 60 g, between 30 g and 70 g, between 15 g and 45 g, between 25 g and 55 g, between 20 g and 40 g, between 30 g and 50 g, or about 30 g.

The heating and cooling system 142 is connected in thermal communication with the charcoal column assembly 138, and is operable to heat and cool the charcoal column assembly 138 during the Xe-133 production process. The heating and cooling system 142 may generally include any combination of heating and/or cooling devices (e.g., electric heaters, cooling coils, etc.) that enables the system 100 to function as described herein. In one embodiment, for example, the heating and cooling system 142 is a heat exchanger in thermal communication with the charcoal column assembly 138 that receives a heating fluid or a cooling fluid to heat or cool the charcoal column assembly 138, respectively.

The carrier gas supply 146 is selectively connectable to an inlet of the charcoal column assembly 138, for example, to desorb Xenon-133 from the charcoal column assembly 138 during the desorption process, and includes suitable gas flow components for supplying a carrier gas to the charcoal column assembly 138. In some embodiments, for example, the carrier gas supply 146 includes a carrier gas storage tank, a fluid conduit connecting the carrier gas storage tank to the charcoal column assembly 138, and a control valve to control the flow of the carrier gas through the charcoal column assembly 138. In one embodiment, the carrier gas is Helium, although the carrier gas may include any suitable inert gas that enables the system 100 to function as described herein. In the illustrated embodiment, the carrier gas supply 146 is located entirely within the Xenon collection station 108 and the associated second glove box 116. In other embodiments, components of the carrier gas supply 146, such as a carrier gas storage tank, is located outside the second glove box 116.

The coil assembly 140 is located downstream from the charcoal column assembly 138, and is selectively connectable to an outlet of the charcoal column assembly 138 for receiving the carrier gas and desorbed Xe-133 entrained in the carrier gas. The coil assembly 140 has a coil configuration suitable for heat exchange with the surrounding environment. The coil assembly 140 is located in a chamber or pocket (not shown in FIG. 1) within the second glove box 116 for receiving a volume of cooling fluid (e.g., liquid nitrogen) therein. In some embodiments, the chamber or pocket is defined by a vacuum flask (e.g., a Dewar flask) that contains a volume of cooling fluid. The coil assembly 140 has a volume for receiving Xe-133 gas therein. In some embodiments, the coil assembly 140 has a volume of between about 10 mL and about 100 mL, between about 10 mL and about 60 mL, between about 20 mL and about 80 mL, between about 10 mL and about 50 mL, between about 20 mL and about 60 mL, between about 10 mL and about 40 mL, between about 20 mL and about 50 mL, between about 20 mL and about 40 mL, or about 30 mL.

The flow controller 144 is operable to control or regulate the flow of gas through the Xenon collection station 108, and may generally include any suitable flow regulating device or combination of devices that enables the system 100 to function as described herein. In some embodiments, for example, the flow controller 144 includes a mass flow controller operable to limit or regulate the flow of gas therethrough.

In operation, the system 100 is used to produce Xe-133 from an off gas produced during dissolution of enriched Uranium targets. In some embodiments, the Xe-133 is produced from an off gas produced during a Mo-99 production process. In some embodiments, the Xe-133 production process is carried out in multiple stages or "steps". The general process flow of an Xe-133 production process is illustrated by directional arrows in FIG. 1, with the various steps labeled "Step 1," "Step 2," "Step 3," and "Step 4".

The off gas generated during dissolution of the enriched Uranium targets is collected in the storage tank 120. In some embodiments, the off gas is allowed to cool or decay for a period of time following the end of irradiation of the enriched Uranium targets, such as 24 hours, 36 hours, 48 hours, or any other suitable period of time.

In the first or adsorption step of the example Xe-133 production process, once the off gas is allowed to cool or decay for a set amount of time, the off gas is drawn or pumped from the storage tank 120 by the first vacuum pump 126. The off gas is directed through the particle filter 122 to filter out particulates from the off gas stream, and through the first zeolite column assembly 124 to remove water vapor from the off gas stream. The off gas is then directed through the pump station 106 and towards the Xenon collection station 108 via the second vacuum pump 128. The pressure controller 130 controls or regulates the first vacuum pump 126 and/or the second vacuum pump 128 to maintain a set pressure, flow rate, and/or gas velocity of the off gas throughout the system 100 during the adsorption process.

The off gas is then directed through the $CO_2$ removal column assembly, which removes $CO_2$ from the off gas stream. The off gas is then directed through the charcoal column assembly 138, which is held at a cooled temperature by the heating and cooling system 142. In some embodiments, the charcoal column assembly 138 is cooled by the heating and cooling system 142 to a temperature in the range of −10° C. to 10° C., −10° C. to 5° C., −5° C. to 10° C., −5° C. to 5° C., 0° C. to 10° C., or 0° C. to 6° C. As the off gas passes through the cooled charcoal column assembly 138, Xe-133 is selectively or preferentially adsorbed onto the charcoal column assembly 138 relative to other gases (e.g., Kr-85) within the off gas. Other gases, such as He and Kr-85, pass through the charcoal column assembly 138, and are directed to the post-processing and air cleaning system 110, which includes, for example, gas delay filters 152.

In the selective adsorption step (i.e., Step 1), the second vacuum pump 128 is connected to the outlet of the charcoal column assembly 138 to direct or draw the off gas through the charcoal column assembly 138 and towards the post-processing and air cleaning system 110.

After adsorption of the Xe-133 onto the charcoal column assembly 138, the charcoal column assembly 138 is disconnected from the off gas supply line (i.e., the storage tank 120), and sealed. The charcoal column assembly 138 is then heated by the heating and cooling system 142 to a temperature at which the Xe-133 desorbs from the charcoal column assembly 138. In some embodiments, the charcoal the charcoal column assembly 138 is heated to a temperature of at least 60° C., at least 65° C., at least 70° C., at least 75° C., at least 80° C., at least 85° C., at least 90° C., and up to 120° C.

Once the charcoal column assembly 138 reaches the desired temperature, the inlet of the charcoal column assembly 138 is connected to the carrier gas supply 146, and the outlet of the charcoal column assembly 138 is connected to an inlet of the coil assembly 140. The coil assembly 140 is submerged in a cooling fluid (e.g., liquid nitrogen) such that the coil assembly 140 is cooled to a temperature at which Xe-133 gas condenses and/or crystallizes within the coil assembly 140. Suitable temperatures to which the coil assembly 140 may be cooled during the desorption process include, for example and without limitation, less than −100° C., less than −125° C., less than −150° C., less than −170° C., less than −180° C., less than −190° C., less than −195° C., and down to −200° C.

The carrier gas from the carrier gas supply 146 passes through the heated charcoal column assembly 138, removing Xe-133 from the charcoal column assembly 138. The carrier gas and Xe-133 then pass through the coil assembly 140, where Xe-133 condenses and/or crystallizes within the coil assembly 140. Other gases, such as Kr-85 and the carrier gas (e.g., He) pass through the coil assembly 140. The outlet of the coil assembly 140 is connected to the second vacuum pump 128 such that gases not entrapped within the coil assembly 140 pass through the second vacuum pump 128 to the post-processing and air cleaning system 110.

After the desorption step (i.e., Step 2), any non-condensed or non-solidified gas within the coil assembly 140 is evacuated (Step 3). The coil assembly 140 may be evacuated using the second vacuum pump 128, or using a separate evacuation device 148 as shown in FIG. 1. In this embodiment, the evacuation device 148 includes at least one evacuated container that is selectively connectable to an outlet of the coil assembly 140 (e.g., following the desorption step to evacuate the coil assembly 140). The evacuation device 148 also includes a fluid conduit and a flow restrictor. The coil assembly 140 is connected to the evacuated container using the fluid conduit such that the flow restrictor is fluidly connected between the coil assembly 140 and the evacuated container. The flow restrictor limits the flow rate of gas out of the coil assembly to prevent or inhibit evaporation and loss of Xe-133 within the coil assembly.

After the evacuation step (Step 3), the inlet and outlet valves of the coil assembly 140 are closed, and the coil assembly 140 is removed from the cooling fluid. The coil assembly 140 is allowed to reach ambient temperature, and the activity of Xe-133 gas is measured and a sample of the Xe-133 gas is taken using the sample collection device 150. The coil assembly 140 containing the Xe-133 is then packed in a suitable shielded transport container, and prepared for shipment.

Figure 2:
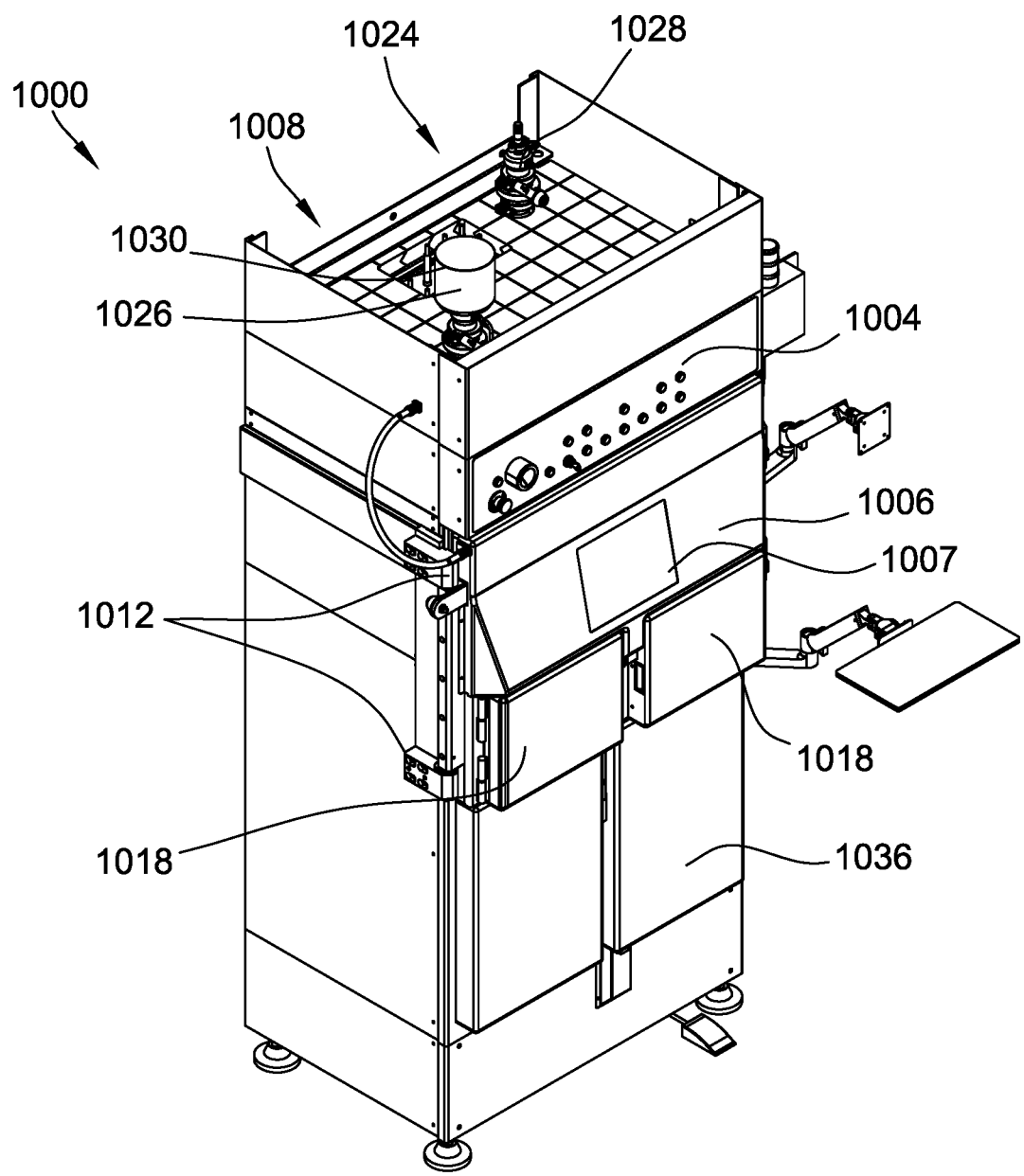
FIG. 2 is a perspective view of an example glovebox suitable for use in the system shown in FIG. 1 and Xe-133 production processes described herein.
Figure 3:
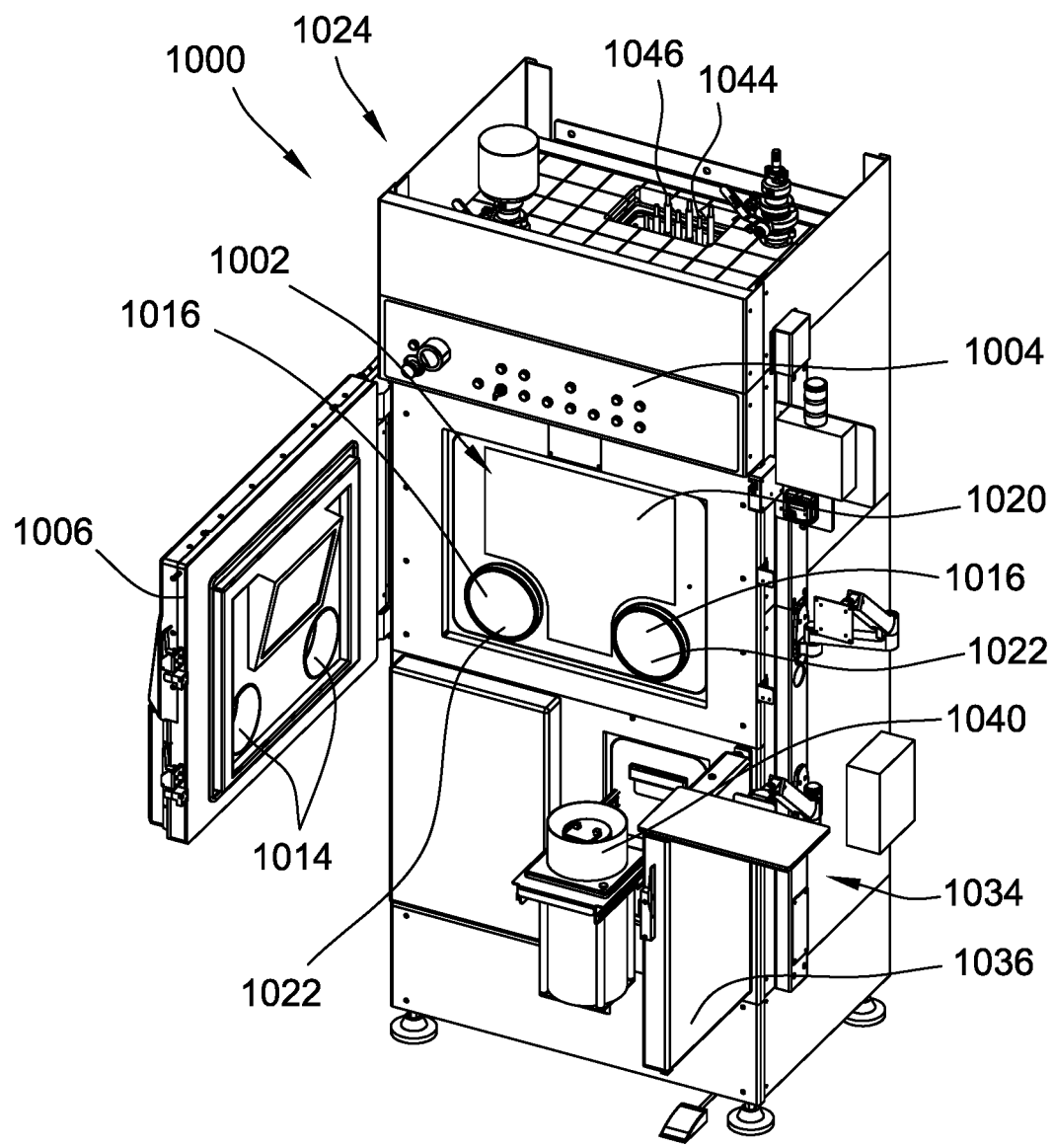
FIG. 3 is another perspective view of the example glovebox shown in FIG. 2 with a hot cell door of the glove box in an opened position.

FIG. 2 is a perspective view of an example glovebox 1000 suitable for use with the system 100 shown in FIG. 1 and in the Xe-133 production processes described herein. FIG. 3 is another perspective view of the example glovebox 1000 shown in FIG. 2. While the glovebox 1000 is described herein with reference to the production of Xe-133, it is understood that the glovebox 1000 may be used to separate and produce gases from the production of Mo-99 other than Xe-133. Gloveboxes 1000 are typically used in the radiopharmaceutical and nuclear energy industries to shield and protect personnel from the radioactive material contained therein and radiation emitted therefrom. In some aspects, the glovebox 1000 prevents or mitigates contamination of the external environment with hazardous components from within the glovebox 1000, such as radioactive material, chemical toxins and/or biological toxins. In some other aspects, the glovebox 1000 prevents or mitigates contamination of the glovebox 1000 with contaminants from the environment external to the glovebox 1000, such as microbes that could compromise the sterility of material in the glovebox 1000.

In the illustrated embodiment, the glovebox 1000 includes a shielded nuclear radiation containment chamber or shielded processing space 1002, also referred to herein as a "hot cell", a control panel 1004, a hot cell door 1006, and a filtration system 1008. The hot cell 1002 includes an enclosure constructed of nuclear radiation shielding material 1010 (shown in FIGS. 6 and 9) designed to shield the surrounding environment from nuclear radiation. Suitable shielding materials 1010 from which hot cells 1002 may be constructed include, for example and without limitation, lead, depleted uranium, and tungsten. In some embodiments, hot cells 1002 are constructed of steel-clad lead walls.

The control panel 1004 is positioned above the hot cell door 1006, and allows an operator to control the systems and processes within the glovebox 1000. For example, the control panel 1004 allows the operator to control the filtration system 1008 and the Xe-133 production processes described herein. The control panel 1004 may control any system, process, or device within the glovebox 1000 that allows the glovebox 1000 and/or the Xe-133 production process to operate as described herein.

Figure 4:
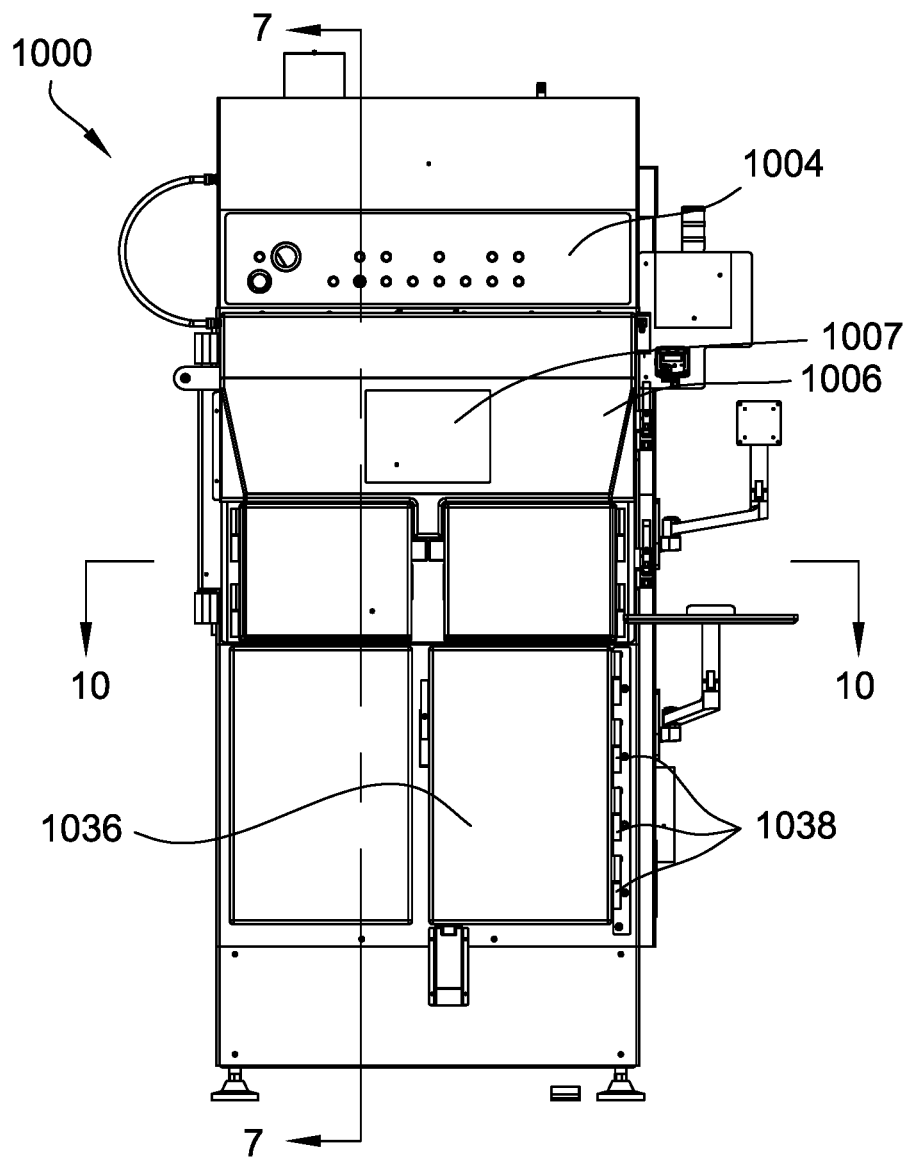
FIG. 4 is a front view of the example glovebox shown in FIG. 2.
Figure 5:
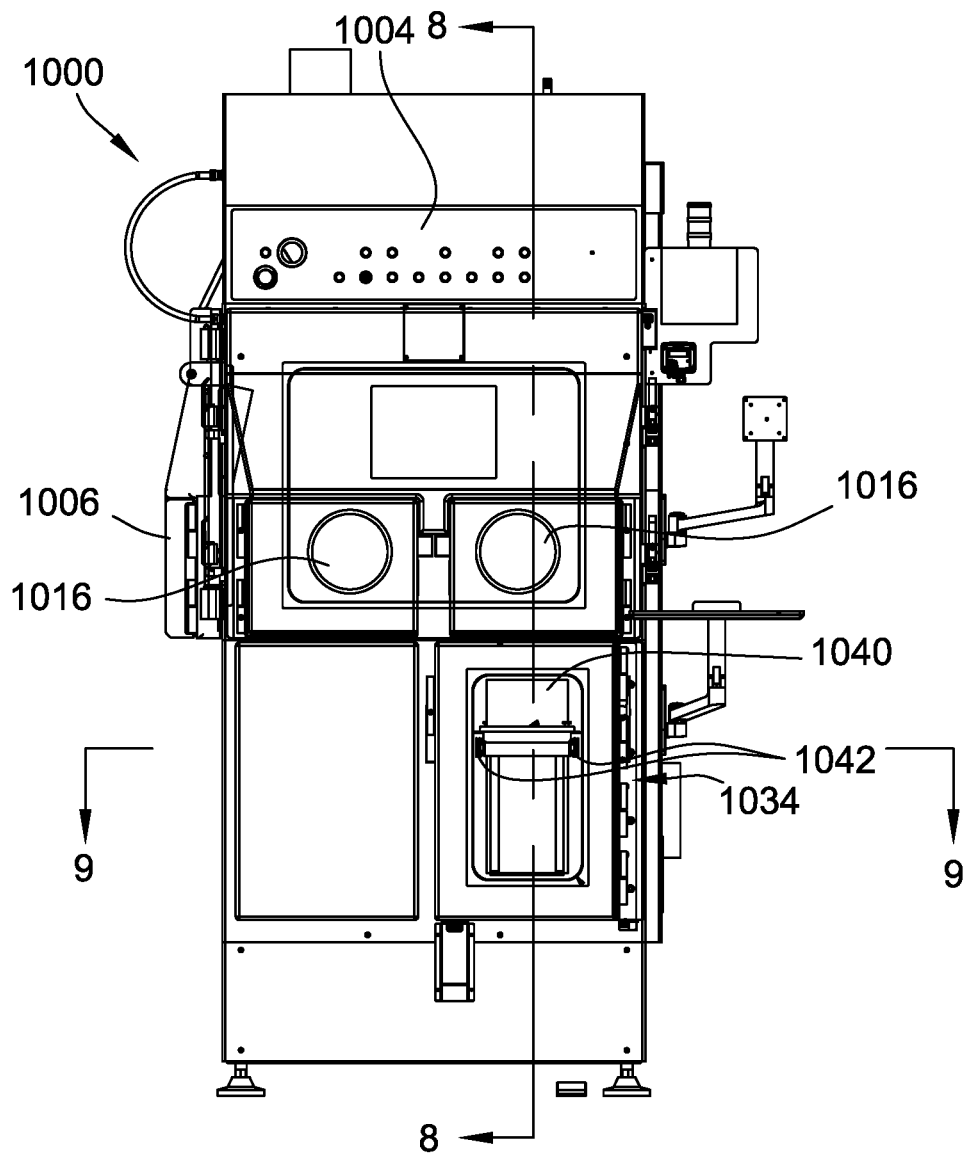
FIG. 5 is another front view of the example glovebox shown in FIG. 2 with the hot cell door in the opened position.

FIG. 4 is a front view of the example glovebox 1000 shown in FIG. 2. FIG. 5 is a front view of the example glovebox 1000 shown in FIG. 2 with portions of a front of the glovebox 1000 removed for clarity. The hot cell door 1006 is attached to the glovebox 1000 by a plurality of hinges 1012 and rotates about the hinges 1012, allowing access to the hot cell 1002. The hot cell door 1006 includes a viewing window 1007 constructed of a transparent shielding material. Suitable materials from which the viewing window 1007 may be constructed include, for example and without limitation, lead glass. The hot cell door 1006 defines a pair of glove ports 1014 configured to allow access to a pair of shielded gloves 1016 extending into the hot cell 1002. A pair of glove port doors 1018 is attached by hinges to the hot cell door 1006. Opening the glove port doors 1018 allows the operator to access the shielded gloves 1016 and operate equipment within the hot cell 1002. In the example embodiment, the shielded gloves 1016 are made of a synthetic rubber (e.g., neoprene) loaded with lead to shield the operator's hands from nuclear radiation generated within the hot cell 1002. In alternative embodiments, the shielded gloves 1016 are made of any material that allows the operator to safely operate equipment within the hot cell 1002.

A transparent panel 1020 is positioned behind the hot cell door 1006 and partially defines a portion of the hot cell 1002. The transparent panel 1020 defines a pair of panel glove ports 1022. The shielded gloves 1016 are attached to the panel glove ports 1022 such that an air tight seal is formed at the attachment point. Additionally, the transparent panel 1020 is attached to the shielding material 1010 such that an air tight seal is formed around the transparent panel 1020. In the illustrated embodiment, the transparent panel 1020 is made of a transparent, shatter resistant thermoplastic, such as, without limitation, Poly(methyl methacrylate). The transparent panel 1020 may be made of any transparent material that enables glovebox 1000 and/or the Xe-133 production process to operate as described herein.

In the illustrated embodiment, the filtration system 1008 is positioned on a top 1024 of glovebox 1000 and includes an air inlet 1026 and an air outlet 1028. The filtration system 1008 is configured to supply the hot cell 1002 with air while simultaneously providing separation between a processing environment within the hot cell 1002 and the surrounding environment external to the hot cell 1002. The filtration system 1008 of this embodiment is configured to channel a flow of air though the hot cell 1002. In alternative embodiments, the filtration system 1008 may be configured to channel a flow of inert gas through the hot cell 1002, creating an inert environment within the hot cell 1002. In other embodiments, the filtration system 1008 is configured to partially remove air from the hot cell 1002, creating a vacuum chamber within the hot cell 1002.

In this embodiment, the air inlet 1026 and the air outlet 1028 each include a filter 1030 configured to remove contaminates from the flow of air before channeling the flow of air into or out of the hot cell 1002. The filters 1030 are suitably High Efficiency Particulate Air (HEPA) filters. In addition to HEPA filters, the air inlet 1026 and the air outlet 1028 may each include an additional filter 1032 (shown in FIG. 8) such as, without limitation, a charcoal filter. In alternative embodiments, the filter 1030 and the additional filter 1032 may be any filtration device that enables glovebox 1000 and/or the Xe-133 production process to operate as described herein.

The glovebox 1000 of this embodiment includes a drawer 1034 configured to allow equipment to enter and exit the hot cell 1002. The drawer 1034 includes a drawer door 1036 attached to the glovebox 1000 by a plurality of drawer door hinges 1038 configured to rotate the drawer door 1036 between an open position and a closed position. The drawer 1036 also includes a bin 1040 attached to a pair of drawer slides 1042 configured to slide the bin 1040 into and out of the glovebox 1000. The bin 1040 is sized and shaped to receive equipment for the Xe-133 production process. Specifically, the bin 1040 is sized and shaped to receive a charcoal column assembly 2000 and a coil assembly 3000, as further described herein.

In this example, the glovebox 1000 includes a plurality of process inlets 1044 and a plurality of process outlets 1046 positioned on the top 1024 of glovebox 1000. The process inlets 1044 channel fluids from the Xe-133 production process into the hot cell 1002 and the process outlets 1046 channel fluids from the Xe-133 production process out of the hot cell 1002. In the illustrated embodiments, the process inlets 1044 are configured to channel the off gas from a zeolite column into the glovebox 1000. The process outlets 1046 are configured to channel the remaining off gas from the Xe-133 separation process to a plurality of Edel Gas Vertragings Filters (EGVF) within the Mo-99 production facility. In alternative embodiments, the process inlet 1044 and the process outlet 1046 are configured to channel any fluid into or out of the hot cell 1002 that enables the glovebox 1000 and/or the Xe-133 production process to operate as described herein.

The glovebox 1000 and/or the hot cell 1002 may be suitably maintained at a predetermined clean room grade (e.g., Grade B or Grade C). Unless otherwise indicated, references to clean room classifications refer to clean room classifications according to Annex 1 of the European Union Guidelines to Good Manufacturing Practice.

Additionally, the pressure within the glovebox 1000 and/or the hot cell 1002 may be controlled at a negative or positive pressure differential relative to the surrounding environment and/or relative to adjacent cells or stations. In some embodiments, for example, all of the gloveboxes 1000 and/or the hot cells 1002 are maintained at a negative pressure relative to the surrounding environment. Moreover, in some embodiments, the glovebox 1000 and/or the hot cell 1002 may be maintained at a positive pressure relative to other gloveboxes 1000 and/or hot cells 1002.

Figure 6:
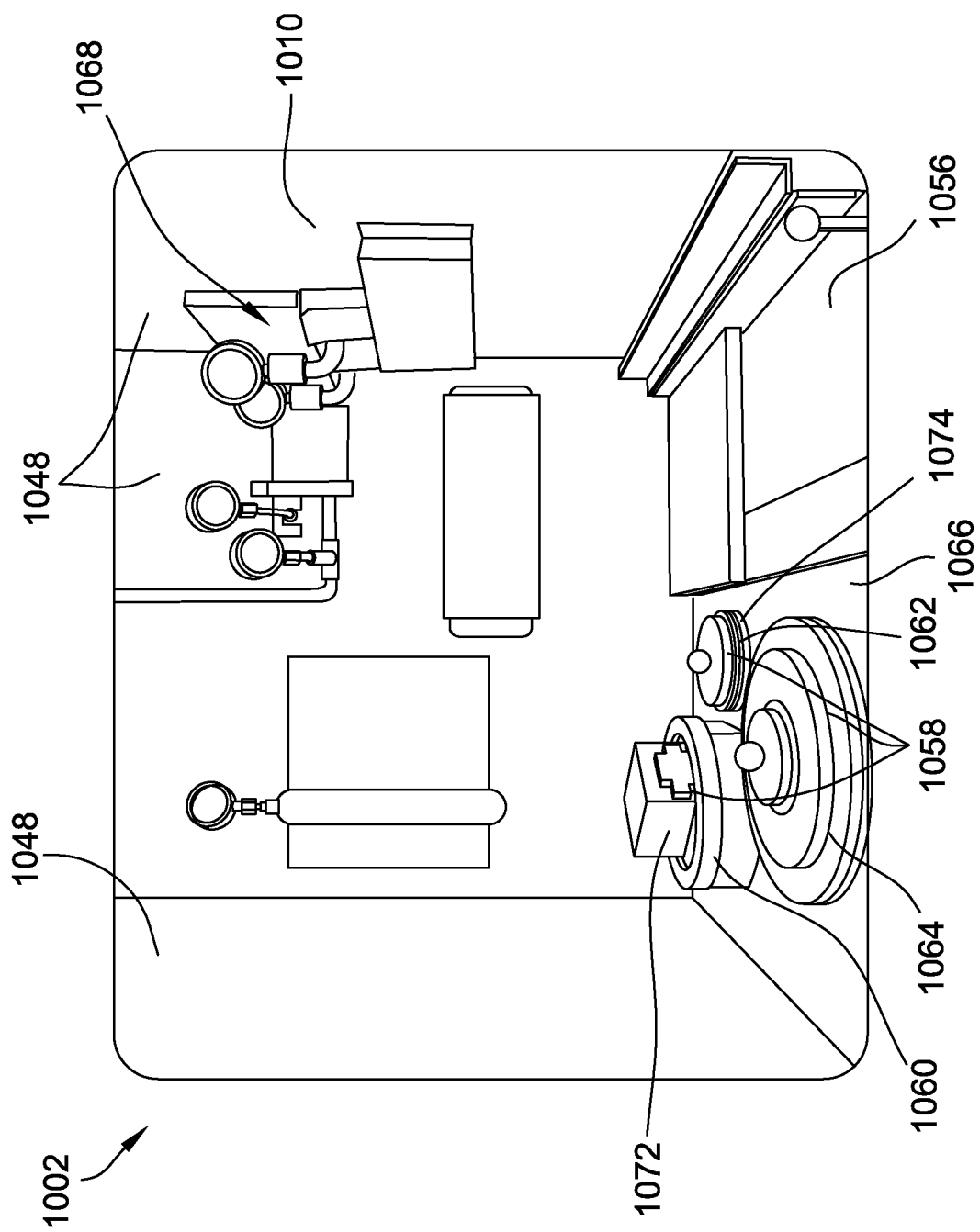
FIG. 6 is a perspective view of an example hot cell within the example glovebox shown in FIG. 2.
Figure 7:
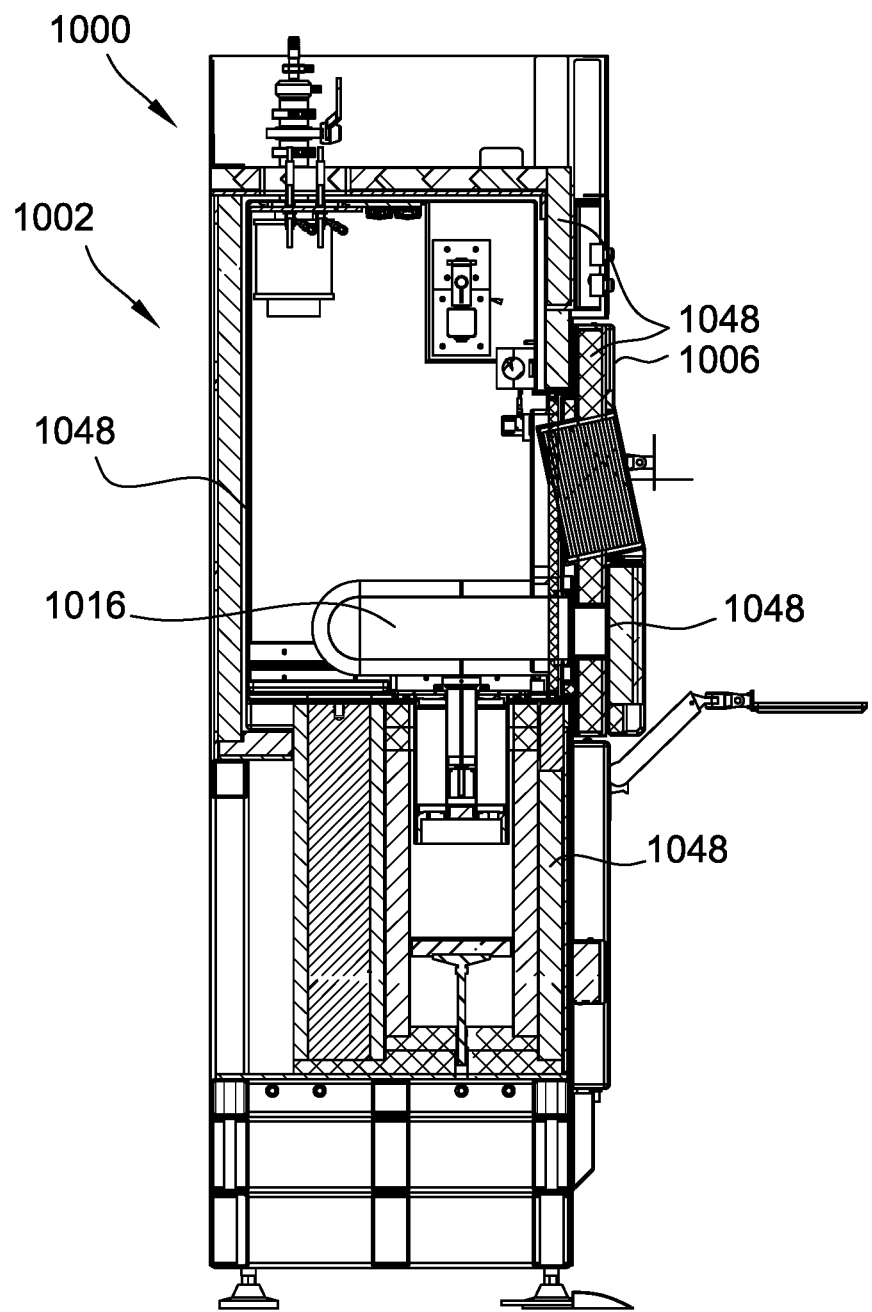
FIG. 7 is a side sectional view of the example glovebox taken along line 7-7 in FIG. 4.
Figure 8:
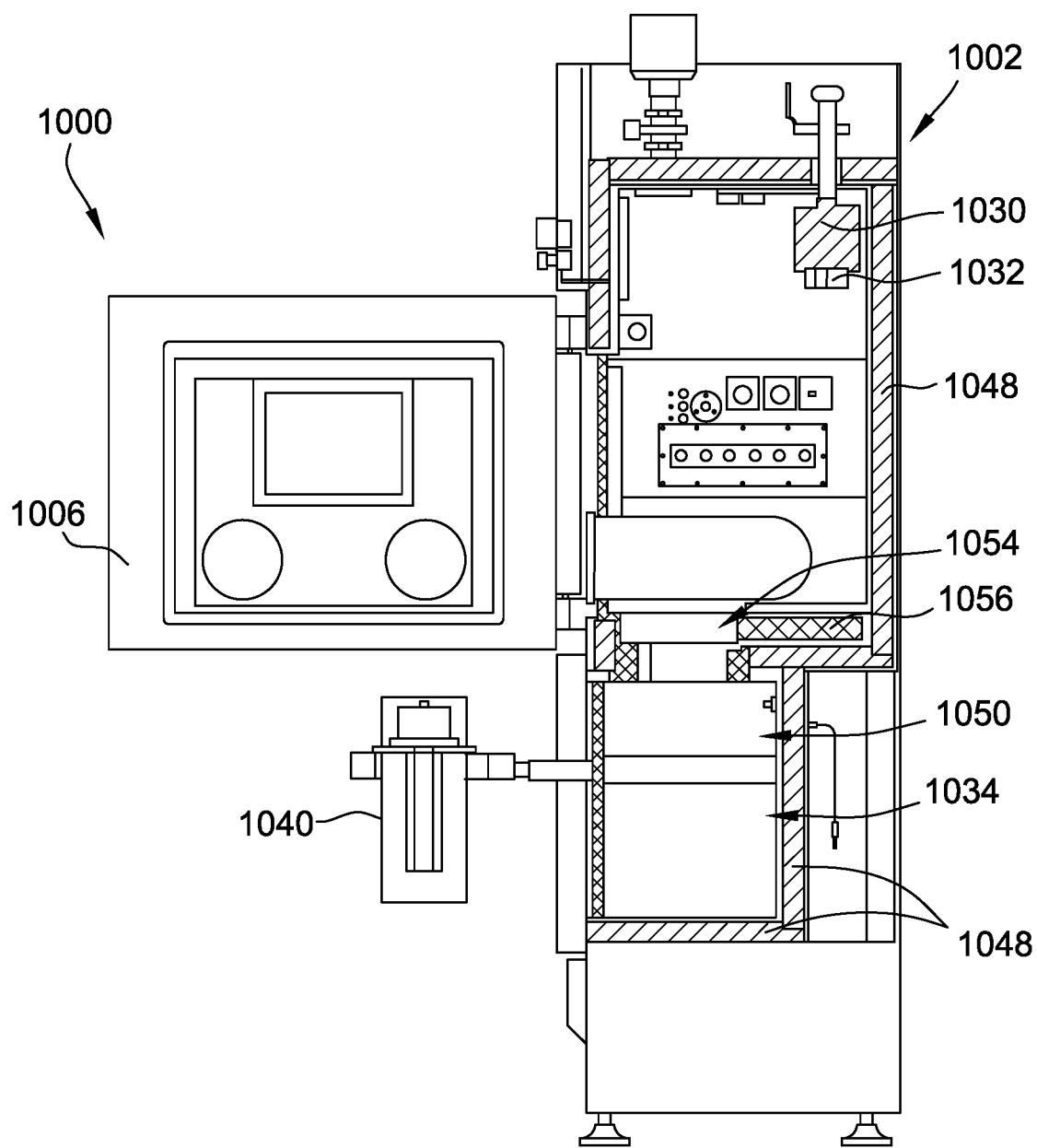
FIG. 8 is another side sectional view of the example glovebox taken along line 8-8 in FIG. 5 with the hot cell door in the opened position.
Figure 9:
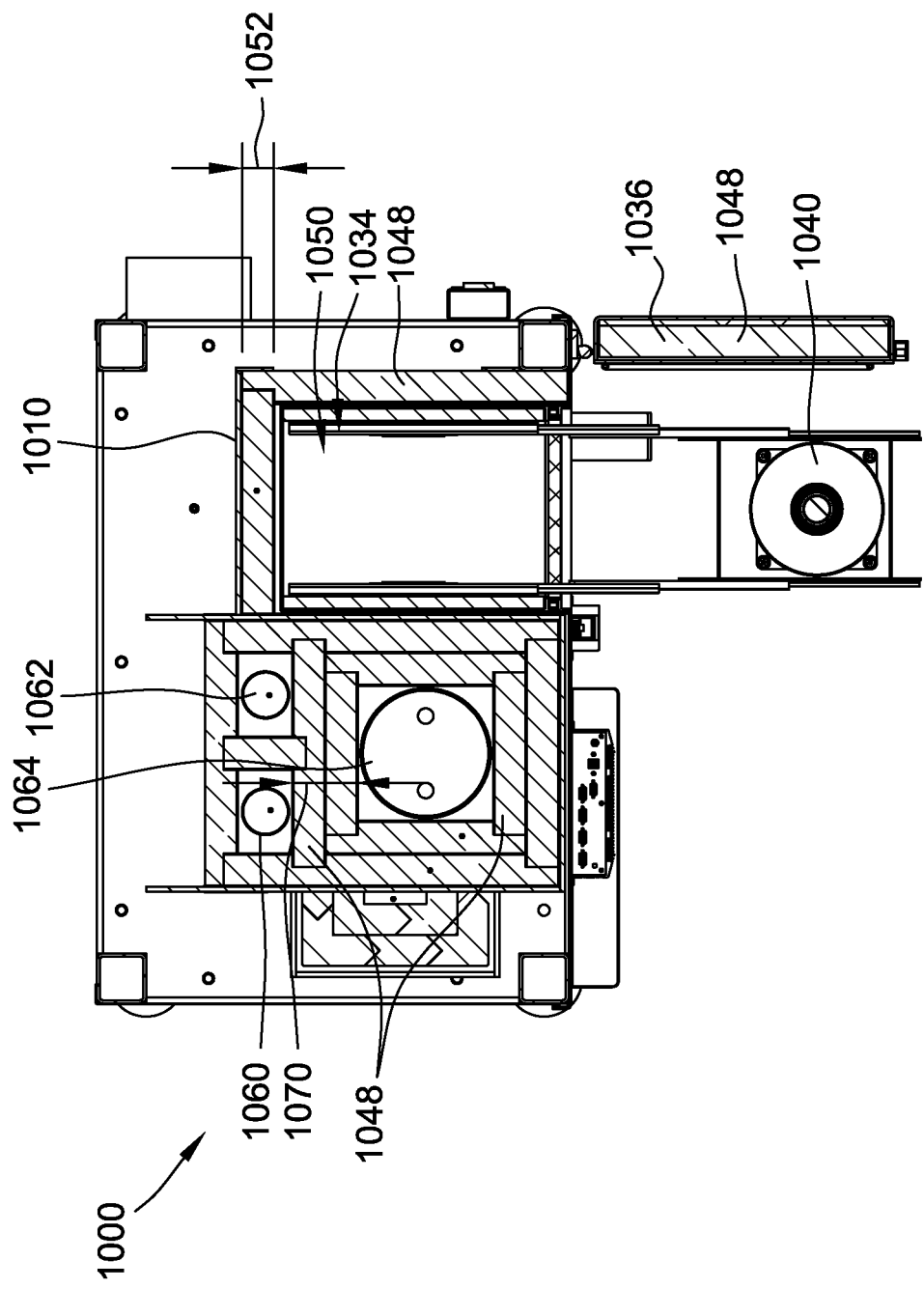
FIG. 9 is a top sectional view of the example glovebox taken along line 9-9 in FIG. 5.
Figure 10:
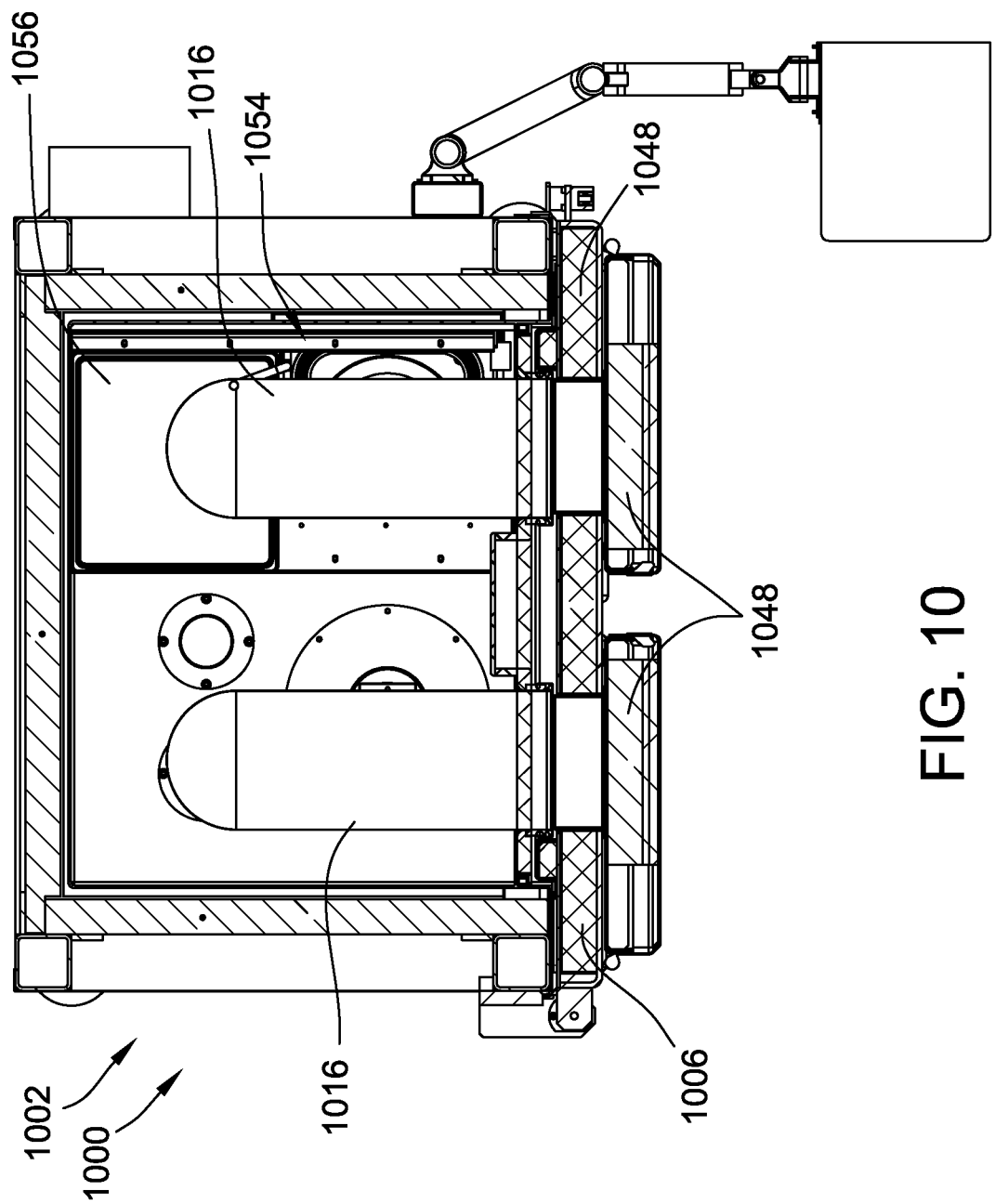
FIG. 10 is a top sectional view of the example glovebox shown in FIG. 2.

FIG. 6 is a perspective view of the hot cell 1002 within the example glovebox 1000 shown in FIG. 2. FIG. 7 is a side sectional view of the glovebox 1000 shown in FIG. 2 taken along sectional line 7-7. FIG. 8 is a side sectional view of the glovebox 1000 shown in FIG. 2 taken along sectional line 8-8. FIG. 9 is a top sectional view of the example glovebox 1000 shown in FIG. 2 taken along sectional line 9-9. FIG. 10 is a top sectional view of the example glovebox 1000 shown in FIG. 2 taken along sectional line 10-10. In the illustrated embodiment, a plurality of shield panels 1048 made of the shielding material 1010 define the hot cell 1002 and a drawer compartment 1050 within the glovebox 1000. Additionally, the hot cell door 1006, the drawer door 1036, and glove port doors 1018 also include shield panels 1048 to shield the surrounding environment form nuclear radiation. The shield panels 1048 each have a shield panel thickness 1052. In the illustrated embodiment, the shield panel thickness 1052 is in a range from about 10 mm to about 200 mm. More specifically, the shield panel thickness 1052 is in a range from about 40 mm to about 110 mm. More particularly, the shield panel thickness 1052 is either about 50 mm or about 100 mm. In the illustrated embodiment, the shield panels 1048 within the hot cell door 1006, the drawer door 1036, and glove port doors 1018 and the shield panels 1048 defining the hot cell 1002 and the drawer compartment 1050 have a shield panel thickness 1052 of about 50 mm.

The drawer compartment 1050 and the hot cell 1002 together define a drawer access opening 1054 which allows access to the drawer compartment 1050 from the hot cell 1002. A drawer shield 1056 is slidably positioned over the drawer access opening 1054 and configured to provide shielding when the drawer door 1036 is open. That is, the drawer shield 1056 covers the drawer access opening 1054 when the drawer door 1036 is open during the process of loading and unloading equipment into the bin 1040 from the surrounding environment. The drawer shield 1056 does not cover the drawer access opening 1054 when the drawer door 1036 is closed during the process of loading and unloading equipment into the bin 1040 from the hot cell 1002.

In the example embodiment, a plurality of processing stations 1058 is positioned within the hot cell 1002. Each processing station 1058 includes equipment configured to perform a step in the Xe-133 production processes described herein. In the illustrated embodiment, the processing stations 1058 include a charcoal column process station 1060, a coil processing station 1062, and a dose calibration station 1064. The processing stations 1058 are wells or compartments defined within a bottom 1066 of the hot cell 1002. Additionally, a plurality of instrumentation devices 1068 configured to measure and control the Xe-133 production process are positioned within the hot cell 1002. The instrumentation devices 1068 include, for example and without limitation, pressure gauges, flow meters, temperature gauges, valves, and Geiger counters. In alternative embodiments, the instrumentation devices 1068 include any device configured to measure or control the Xe-133 production process.

In the illustrated embodiment, shield panels 1048 are arranged around the processing stations 1058 such that the processing stations 1058 are shielded. As shown in FIGS. 7 and 9, shield panels 1048 surround the charcoal column process station or charcoal column assembly receptacle 1060, the coil processing station or coil assembly receptacle 1062, and the dose calibration station 1064 such that the surrounding environment is shielded from nuclear radiation generated within the processing stations 1058. Specifically, the dose calibration station 1064 is surrounded by two shield panels 1048 on each side such that a thickness 1070 of the shielding around the dose calibration station 1064 is between about 50-150 mm thick, or about 80-120 mm thick, or in one example about 100 mm thick.

The charcoal column process station 1060 includes a well or compartment configured to receive the charcoal column assembly 2000 described herein. Specifically, the charcoal column process station 1060 includes a heating and cooling system 1072 positioned within the charcoal column process station 1060 and configured to heat and/or cool the charcoal column assembly 2000. In the example embodiment, the heating and cooling system 1072 is a heat exchanger that circumscribes the charcoal column assembly 2000. The heating and cooling system receives a heating fluid or a cooling fluid (more broadly, a thermal transfer fluid) configured to heat or cool the charcoal column assembly 2000. In alternative embodiments, the heating and cooling system 1072 may be any heating and/or cooling device that enables the glovebox 1000 and the Xe-133 production process to operate as described herein. The coil processing station 1062 includes a well or compartment configured to receive the coil assembly 3000. Specifically, the coil processing station 1062 includes a Dewar flask 1074 positioned within the coil processing station 1062 and configured to cool the coil assembly 3000. The Dewar flask 1074 is a vacuum flask or vessel configured to contain a predetermined volume of liquid nitrogen. The Dewar flask 1074 is filled with liquid nitrogen to a predetermined fill line configured to ensure that a coil 3002 of the coil assembly 3000 is completely submerged within the liquid nitrogen during the separation process.

During operation, an operator places a column transportation vessel, such as column transportation vessel 2500 (FIG. 16), and a coil transportation vessel, such as coil transportation vessel 3500 (FIG. 24), in the bin 1040 and transfers the transportation vessels and into the hot cell 1002 using the drawer 1034. The transportation vessels and are disassembled, and a charcoal column assembly, such as charcoal column assembly 2000 (FIG. 11), is removed from the column transportation vessel and placed into the charcoal column process station 1060. A coil assembly, such as coil assembly 3000 (FIG. 19), is placed into the coil processing station 1062. The charcoal column assembly is fluidly connected to an Ascarite® column and the coil assembly. The charcoal column assembly and the coil assembly are used in the Xe-133 production process as described herein. After the Xe-133 production process is complete, the transportation vessels are reassembled and the purified Xe-133 is transported to other facilities or manufacturing processes for further processing.

Figure 11:
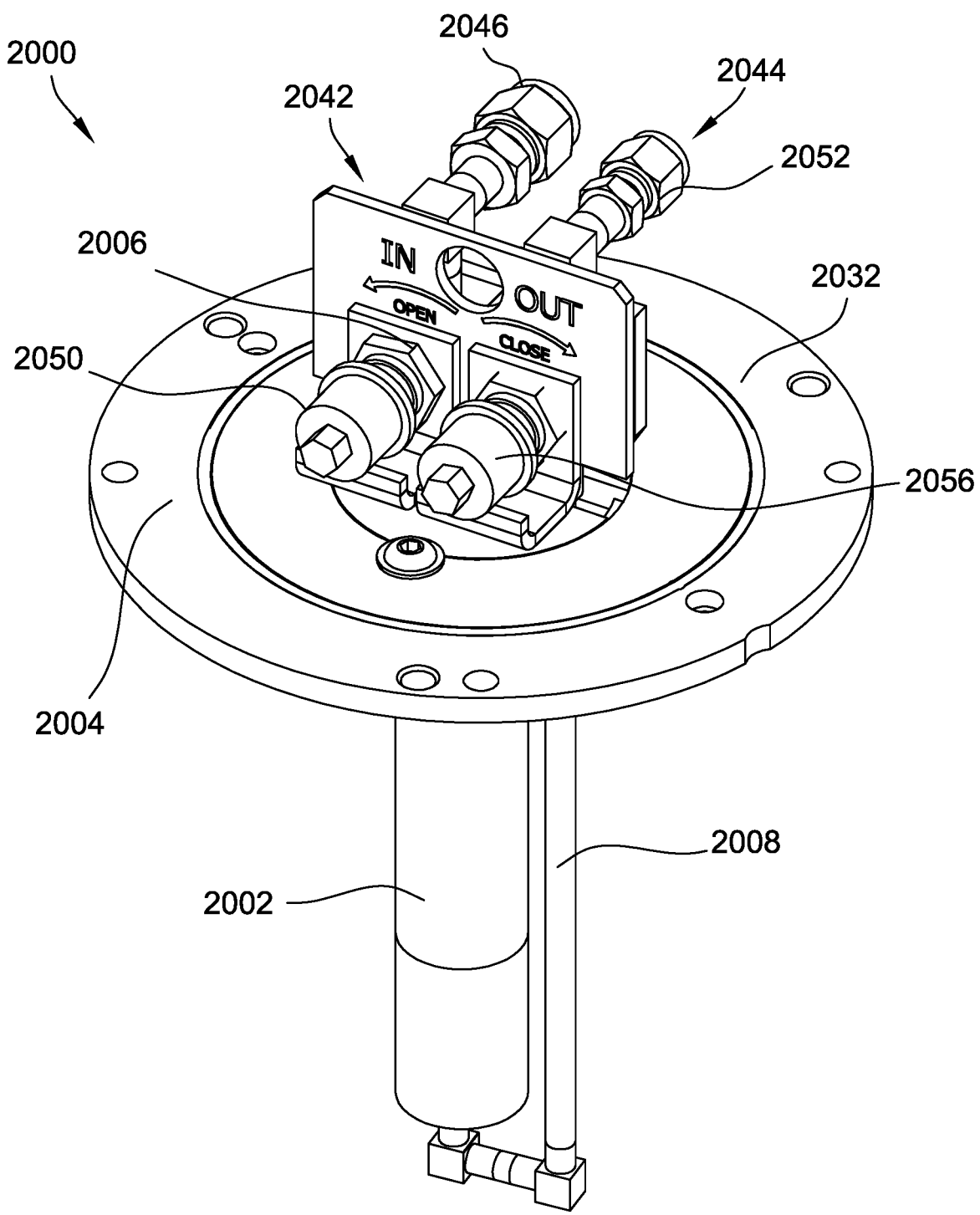
FIG. 11 is a top perspective view of an example charcoal column assembly suitable for use in the system shown in FIG. 1 and the Xe-133 production processes described herein.
Figure 12:
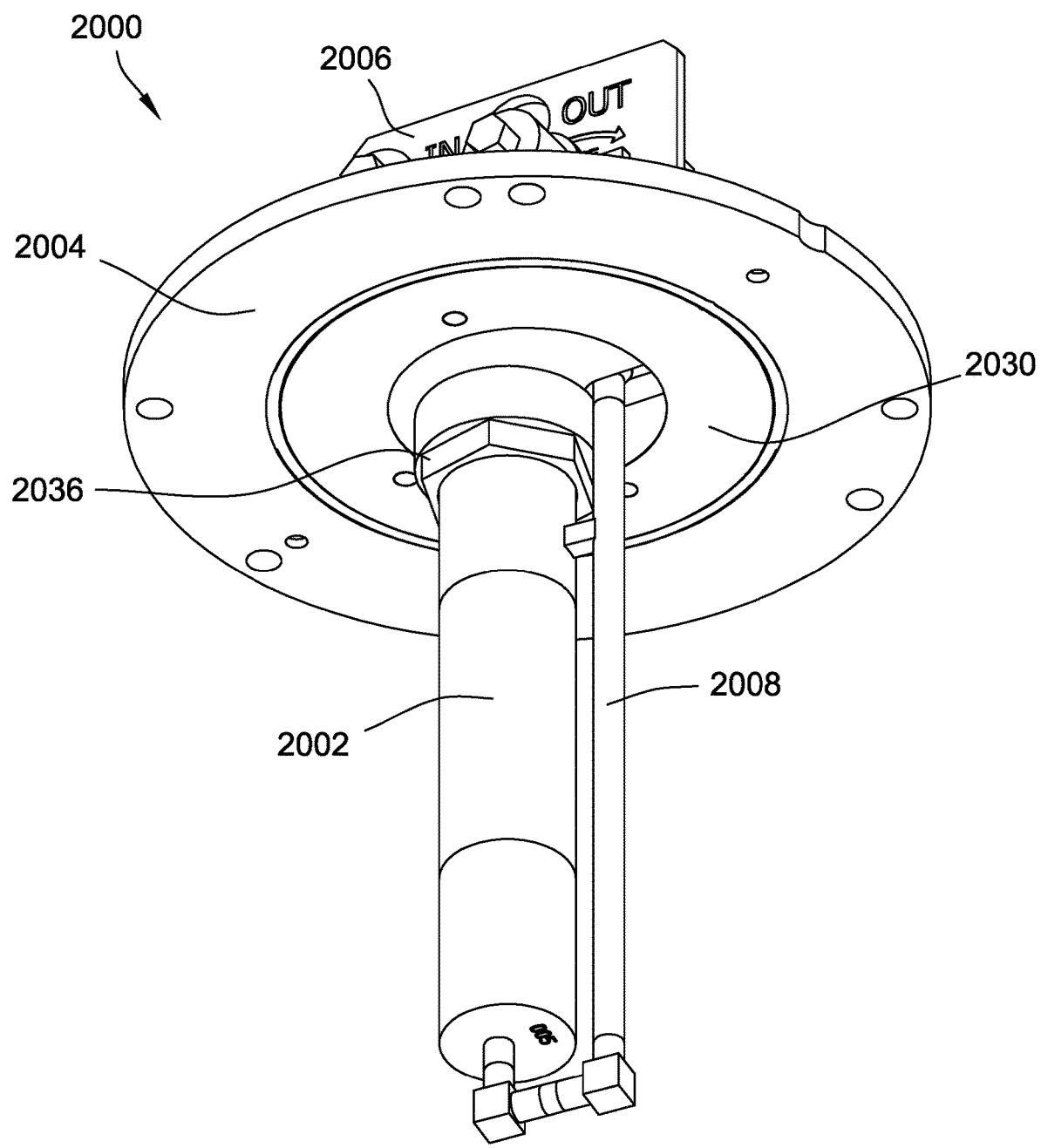
FIG. 12 is a bottom perspective view of the example charcoal column assembly shown in FIG. 11.
Figure 13:
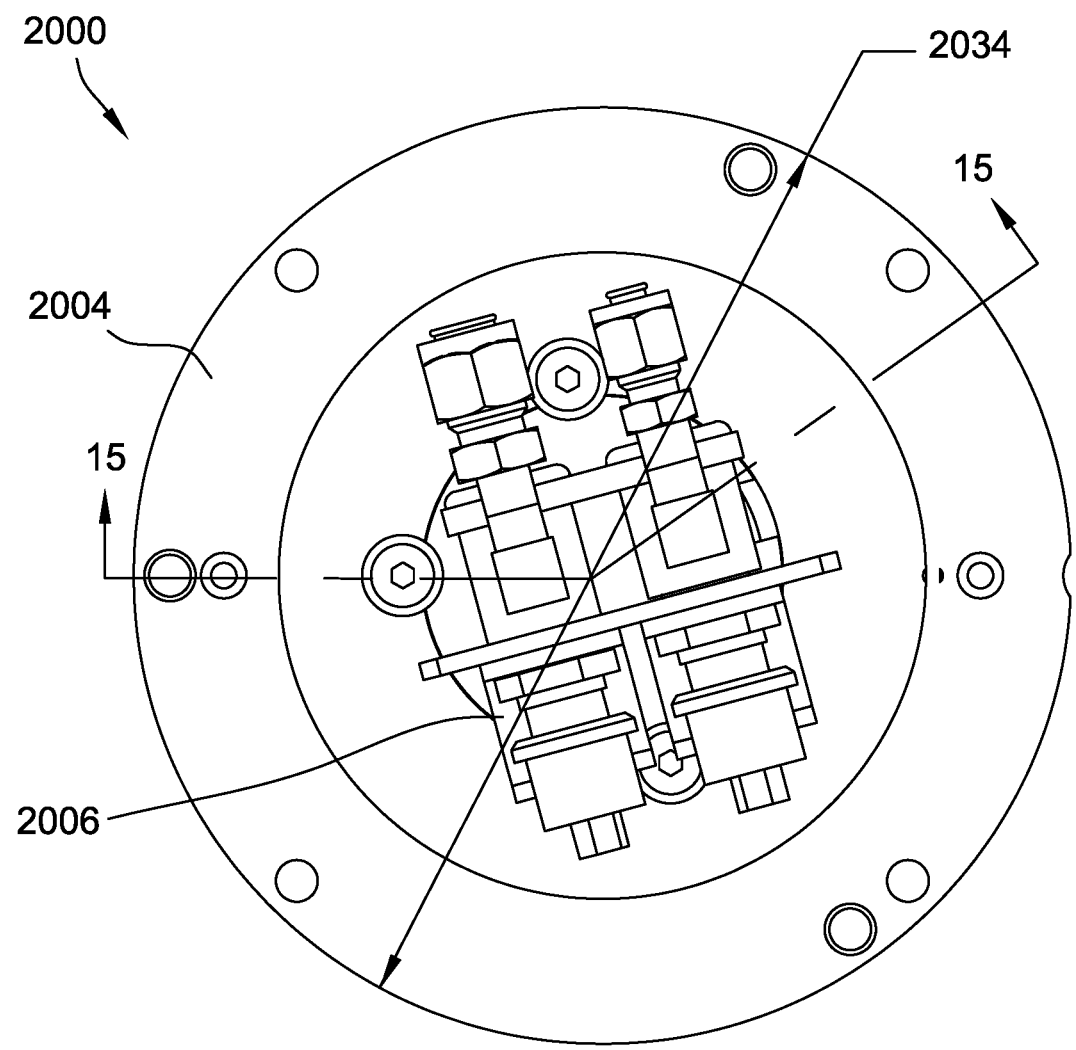
FIG. 13 is a top view of the example charcoal column assembly shown in FIG. 11.
Figure 14:
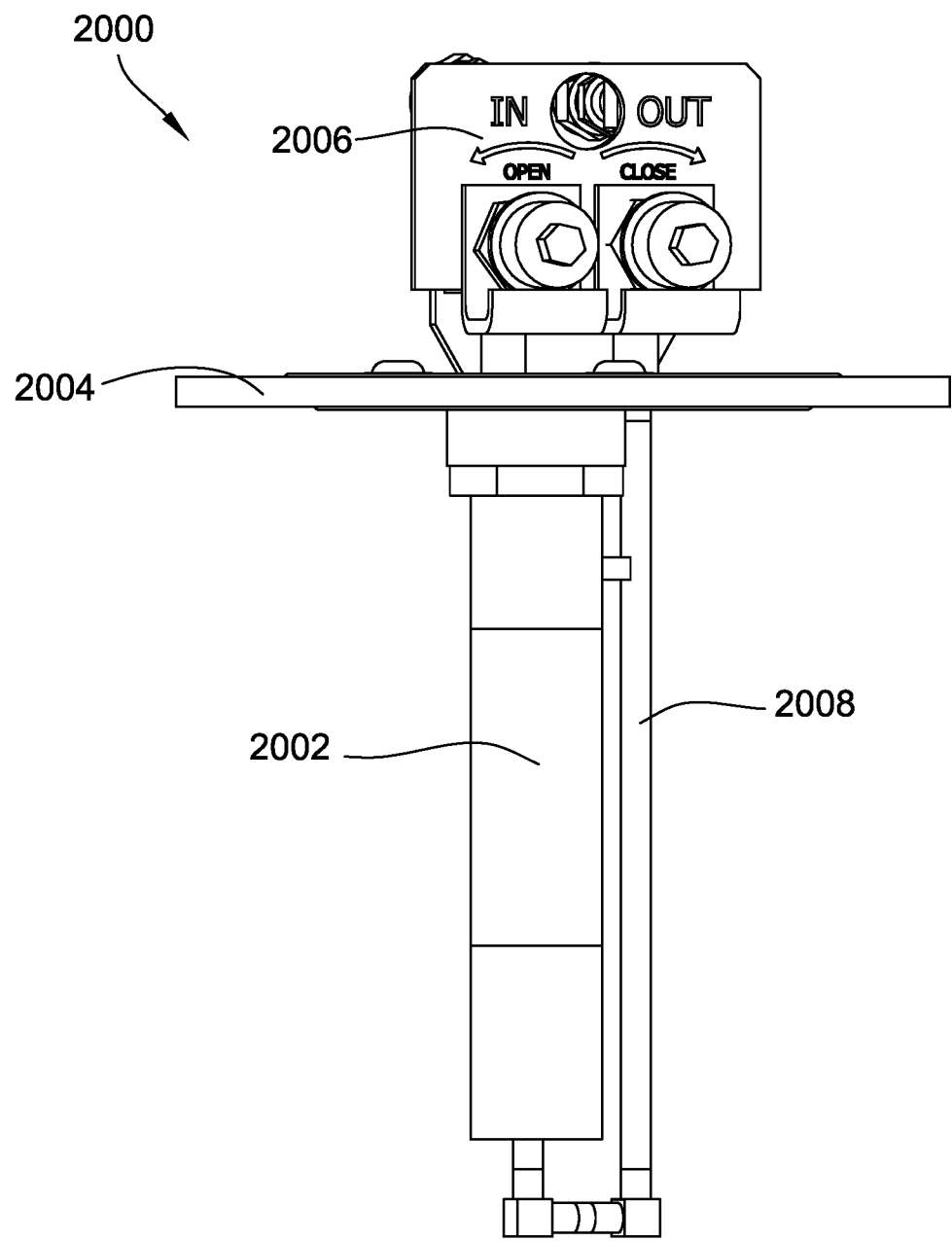
FIG. 14 is a side view of the example charcoal column assembly shown in FIG. 11.
Figure 15:
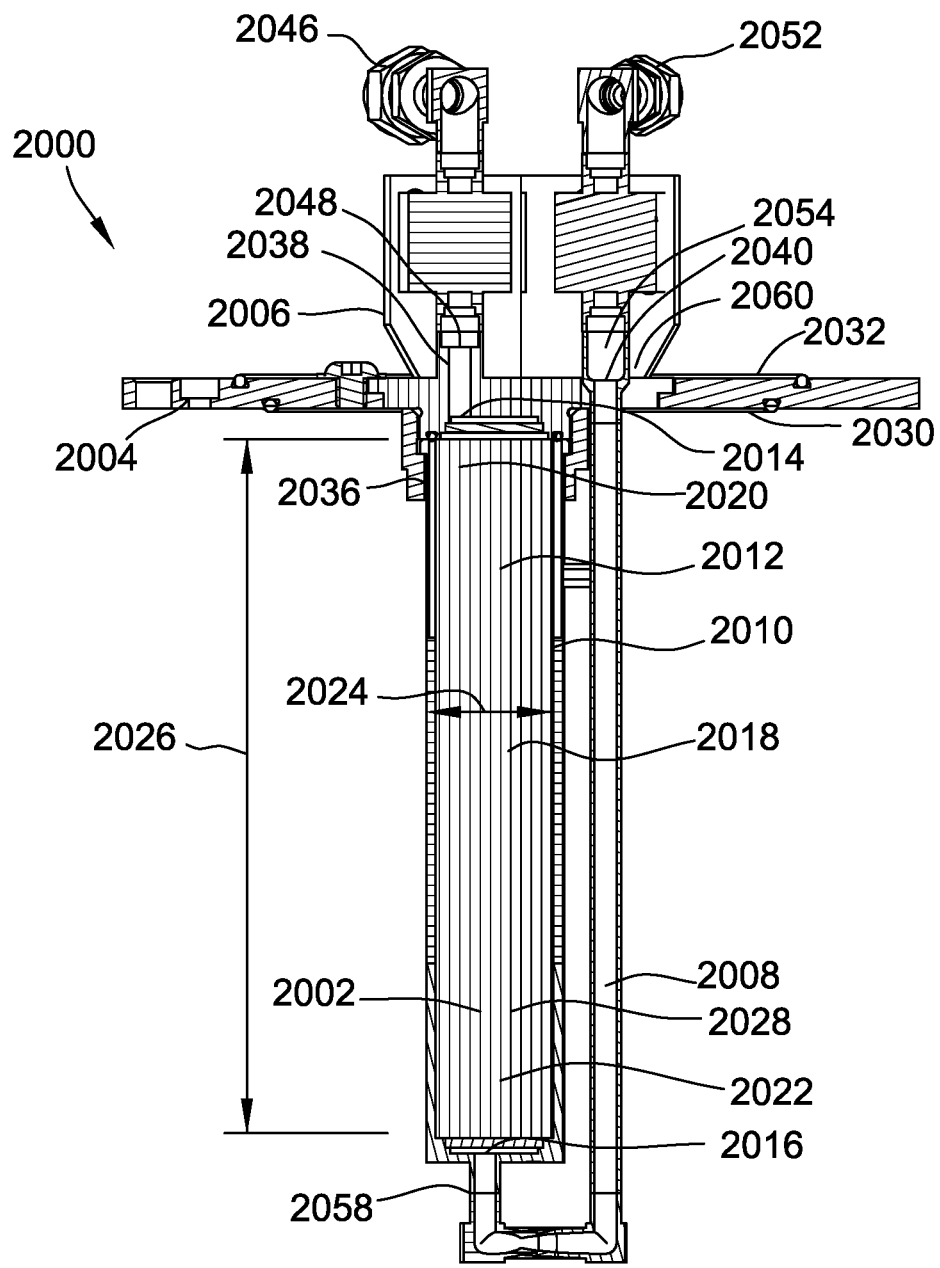
FIG. 15 is a side sectional view of the example charcoal column assembly taken along line 15-15 in FIG. 13.

FIG. 11 is a top perspective view of an example charcoal column assembly 2000 suitable for use in the glovebox 1000 and the Xe-133 production processes described herein. FIG. 12 is a bottom perspective view of the example charcoal column assembly 2000 suitable for use in the glovebox 1000 and the Xe-133 production processes described herein. FIG. 13 is a top view of the example charcoal column assembly 2000 shown in FIG. 11. FIG. 14 is a side view of the example charcoal column assembly 2000 shown in FIG. 11. FIG. 15 is a side sectional view of the example charcoal column assembly 2000 shown in FIG. 11 taken along sectional line 15-15. The charcoal column assembly 2000 is configured to adsorb Xe-133 from an off gas stream generated from the production of Mo-99. The off gas steam includes Xe-133, Kr-85, other isotopes, and other non-radioactive components. The charcoal column assembly 2000 is specifically configured to separate Xe-133 from Kr-85 by adsorbing the Xe-133 while allowing the Kr-85 to pass through the charcoal column assembly 2000. The Xe-133 is then desorbed and channeled to the Xe-133 production processes for further processing.

The charcoal column assembly 2000 includes a charcoal column 2002, a column flange 2004, a fluid control assembly 2006, and an outlet tube 2008. The charcoal column 2002 includes a charcoal column shell 2010 that defines a charcoal column bed 2012, a charcoal column inlet 2014, and a charcoal column outlet 2016. The charcoal column 2002 also has a top 2020 and a bottom 2022. The charcoal column bed 2012 is configured to contain a volume of activated charcoal 2018 configured to adsorb Xe-133. The charcoal column inlet 2014 is defined in the top 2020 of the charcoal column 2002, and the charcoal column outlet 2016 is defined in the bottom 2022 of the charcoal column 2002. The charcoal column bed 2012 has a bed diameter 2024, a bed length 2026, and a bed volume 2028. In the example embodiment, the bed diameter 2024 is in a range from about 10 millimeters (mm) to about 30 mm. More specifically, the bed diameter 2024 is in a range from about 20 mm to about 25 mm. More particularly, the bed diameter 2024 is about 24 mm. In the example embodiment, the bed length 2026 is in a range from about 100 mm to about 200 mm. More specifically, the bed length 2026 is in a range about 120 mm to about 160 mm. More particularly, the bed length 2026 is about 145 mm. In the example embodiment, the bed volume 2028 is in a range from about 50 cubic centimeters (cc) to about 100 cc. More specifically, the bed volume 2028 is in a range from about 55 cc to about 70 cc. More particularly, the bed volume 2028 is about 65 cc.

The column flange 2004 includes a first side or a bottom side 2030, a second side or a top side 2032, a column flange diameter 2034, and a column receiver 2036. The column flange 2004 defines a column flange inlet 2038 and a column flange outlet 2040. The column receiver 2036 extends from the first side 2030 of the column flange 2004 and is sized and shaped to receive the top 2020 of the charcoal column 2002 such that the charcoal column 2002 extends from the first side 2030 of the column flange 2004. In the example embodiment, the column flange diameter 2034 is in a range from about 100 mm to about 200 mm. More specifically, the column flange diameter 2034 is in a range from about 150 mm to about 180 mm. More particularly, the column flange diameter 2034 is about 165 mm.

The fluid control assembly 2006 is positioned on the second side 2032 of the column flange 2004. The fluid control assembly 2006 includes a column inlet assembly 2042 and a column outlet assembly 2044. The column inlet assembly 2042 includes an inlet connector 2046, an inlet tube 2048, and an inlet valve 2050. Similarly, the column outlet assembly 2044 includes an outlet connector 2052, a control assembly outlet tube 2054, and an outlet valve 2056. The inlet connector 2046 and the outlet connector 2052 are configured to connect to an inlet conduit (not shown) and an outlet conduit (not shown) respectively. The inlet conduit is configured to channel a flow of off gas, including Xe-133 and Kr-85, to the inlet connector 2046 and the charcoal column assembly 2000. The outlet conduit is configured to channel the unadsorbed flow of off gas from the outlet connector 2052 and the charcoal column assembly 2000. The inlet tube 2048 is fluidly connected to the inlet connector 2046 and the charcoal column inlet 2014. The inlet tube 2048 extends through the column flange inlet 2038 to the charcoal column inlet 2014. The inlet valve 2050 is attached to the inlet tube 2048 and controls the flow of off gas into the charcoal column 2002. The control assembly outlet tube 2054 is fluidly connected to the outlet connector 2052 and the outlet tube 2008. The control assembly outlet tube 2054 extends through the column flange outlet 2040 to the outlet tube 2008. The outlet valve 2056 is attached to the control assembly outlet tube 2054 and controls the flow of off gas from the charcoal column 2002. In the example embodiment, both the inlet valve 2050 and the outlet valve 2056 are plug valves. In alternative embodiments, the inlet valve 2050 and the outlet valve 2056 may be any type of valve that enables the charcoal column assembly 2000 and the Xe-133 production processes to operate as described herein.

The outlet tube 2008 is fluidly connected to the charcoal column outlet 2016 and the control assembly outlet tube 2054. The outlet tube 2008 includes an outlet tube inlet 2058 fluidly connected to the charcoal column outlet 2016, and an outlet tube outlet 2060 fluidly connected to the control assembly outlet tube 2054. As such, the outlet tube inlet 2058 is positioned proximate the bottom 2022 of the charcoal column 2002 and the outlet tube outlet 2060 extends through the column flange outlet 2040. The outlet tube 2008 is configured to channel the flow of off gas from the charcoal column 2002 to the column outlet assembly 2044.

In the illustrated embodiment, the adsorption of Xe-133 into the activated charcoal 2018 is dependent upon the temperature of the adsorption process, the velocity of the off gas stream through the charcoal column bed 2012, and the concentration of Xe-133 in the off gas stream. In the example embodiment, the temperature of the adsorption process is maintained in a range from about −5° C. to about 20° C. More specifically, the temperature of the adsorption process is maintained in a range from about −5° C. to about 10° C. More particularly, the temperature of the adsorption process is maintained at about 3° C., such that the heating and cooling system 1072 cools the charcoal column assembly 2000 to about 3° C. during the adsorption process. More Xe-133 is adsorbed into the activated charcoal 2018 at lower temperatures. However, more Kr-85 is also adsorbed into the activated charcoal 2018 at lower temperatures. As such, the operating temperature of 3° C. during the adsorption process is a temperature that balances adsorption of Xe-133 and Kr-85.

The velocity of the off gas stream through the charcoal column bed 2012 is determined by the bed diameter 2024 and the flow rate of the off gas in the charcoal column bed 2012. The bed diameter 2024 is a constant determined by the geometry of the charcoal column bed 2012. The flow rate of the off gas in the charcoal column bed 2012 is set such that the velocity of the off gas stream through the charcoal column bed 2012 is a predetermined velocity that promotes the selective adsorption of Xe-133. If the velocity of the off gas stream through the charcoal column bed 2012 is too high, the adsorption of Xe-133 will be too low. Conversely, if the velocity of the off gas stream through the charcoal column bed 2012 is too low, the adsorption of Xe-133 will increase, but the adsorption of Kr-85 also increases. As such, the predetermined velocity is designed to balance the adsorption of Xe-133 with the adsorption of Kr-85. In the example embodiment, the flow rate of the off gas in the charcoal column bed 2012 is in a range of about 1.2 normal liters per minute (NL/min) to about 1.8 NL/min. Additionally, the velocity of the off gas stream through the charcoal column bed 2012 is in a range of about 5 centimeters per second (cm/s) to about 10 cm/s. More particularly, the velocity of the off gas stream through the charcoal column bed 2012 is about 7 cm/s.

Higher concentrations of Xe-133 in the off gas stream generally increase the adsorption of Xe-133 into the activated charcoal 2018. Accordingly, the geometry of the charcoal column bed 2012, the temperature of the adsorption process, and the flow rate of the off gas in the charcoal column bed 2012 can be tuned to balance the selective adsorption of Xe-133 within the activated charcoal 2018.

During operations, the inlet conduit (not shown) channels the flow of off gas to the column inlet assembly 2042 which channels the flow of off gas to the charcoal column 2002. The off gas is channeled through the charcoal column bed 2012, where Xe-133 is selectively adsorbed into the activated charcoal 2018. The heating and cooling system 1072 maintains the temperature of the charcoal column assembly 2000 at 3° C. as the off gas is channeled through the charcoal column bed 2012. The unadsorbed off gas is channeled from the charcoal column bed 2012 through the outlet tube 2008 to the column outlet assembly 2044. The column outlet assembly 2044 channels the unadsorbed off gas to the outlet conduit (not shown).

After the entire volume of off gas has been channeled through the charcoal column 2002, the inlet valve 2050 and the outlet valve 2056 are closed. The outlet conduit is fluidly connected to an inlet of a coil assembly, such as coil assembly 3000. The inlet conduit is fluidly connected to a supply of carrier helium gas. The heating and cooling system 1072 heats the charcoal column assembly 2000 to about 80° C. and a flow of helium carrier gas is channeled through the charcoal column bed 2012. The increased temperature causes the activated charcoal 2018 to desorb the Xe-133 into the flow of helium carrier gas. The desorbed Xe-133 and the flow of helium carrier gas are then channeled to the coil assembly for further processing.

Figure 16:
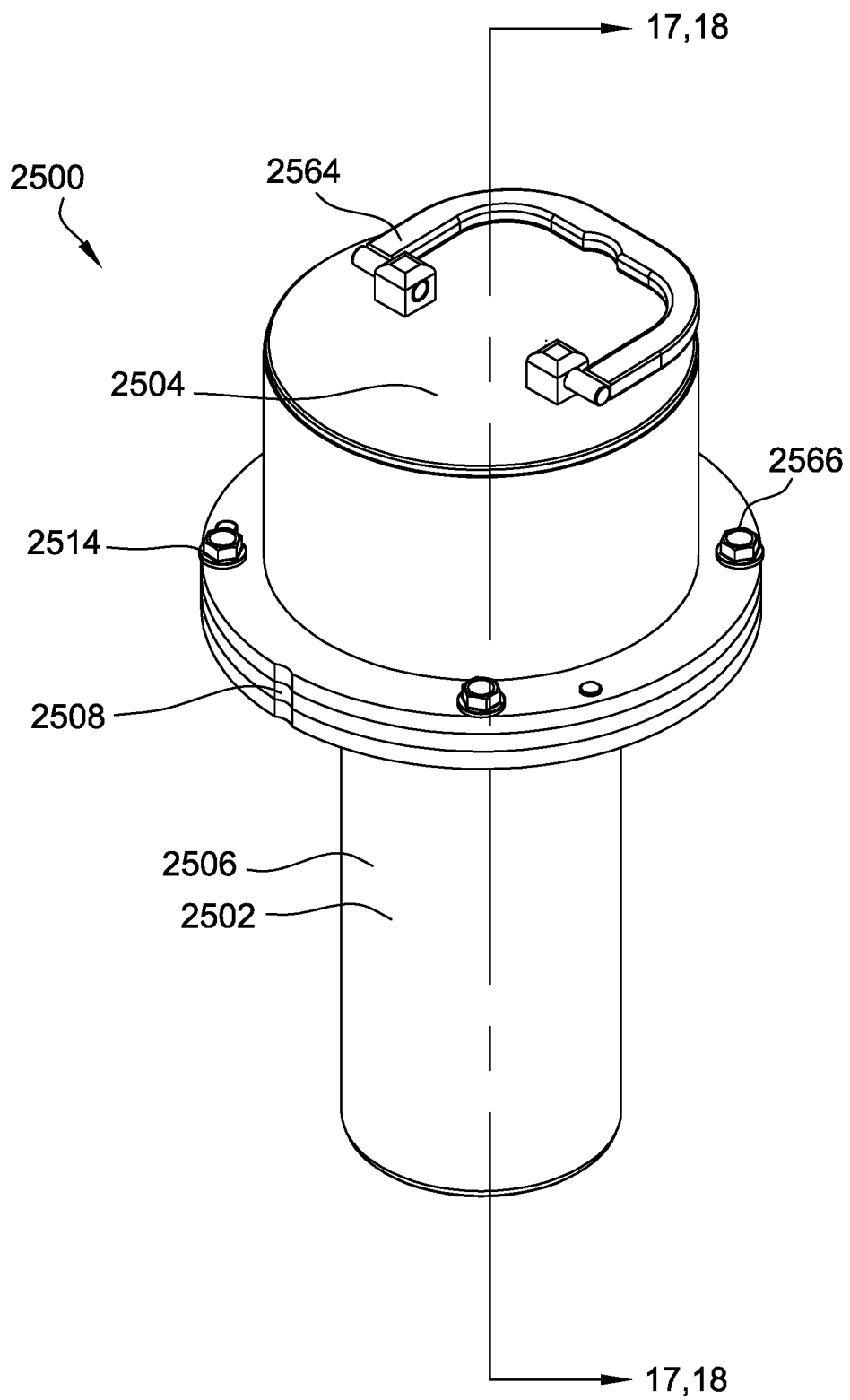
FIG. 16 is a perspective view of an example column transportation vessel suitable for use with the charcoal column assembly shown in FIG. 11.
Figure 17:
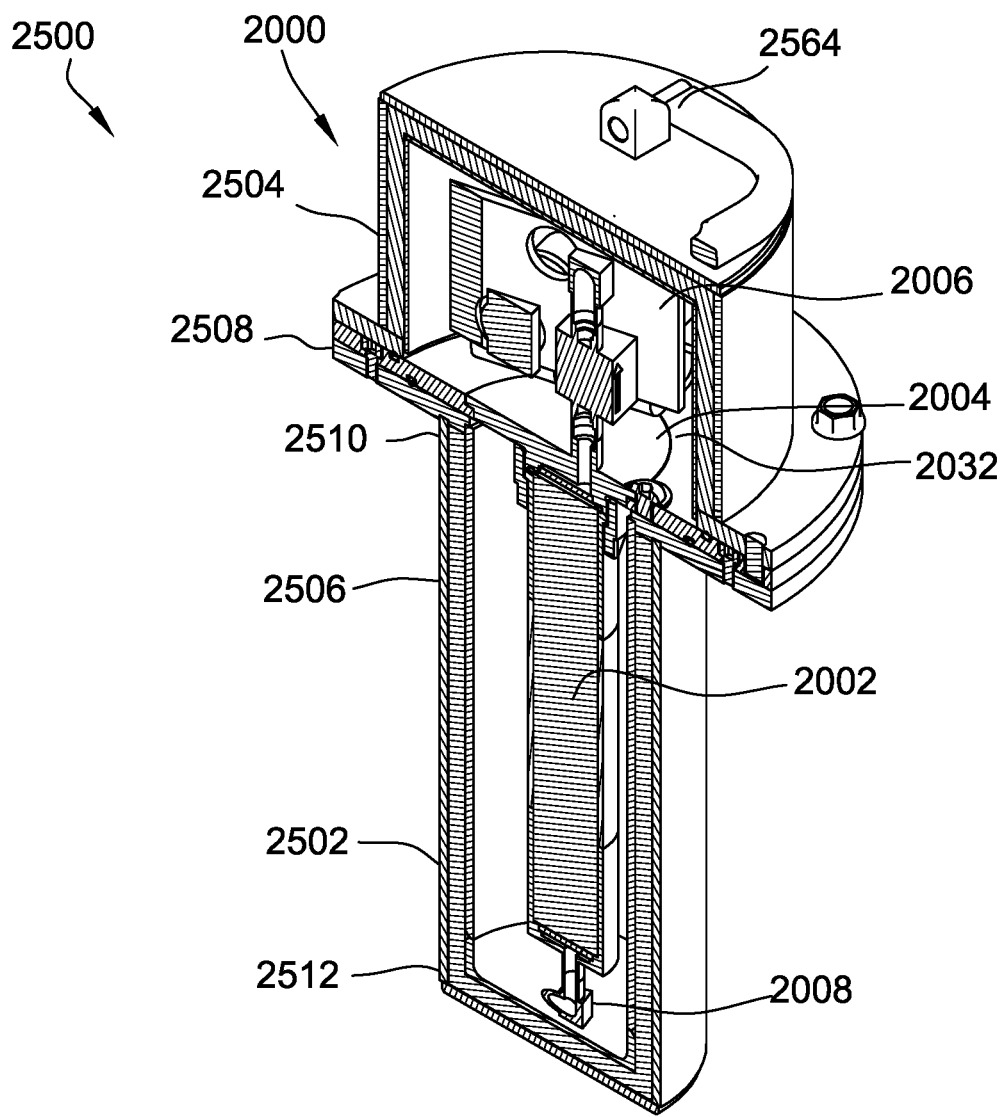
FIG. 17 is a perspective sectional view of the example column transportation vessel taken along line 17-17 in FIG. 16.
Figure 18:
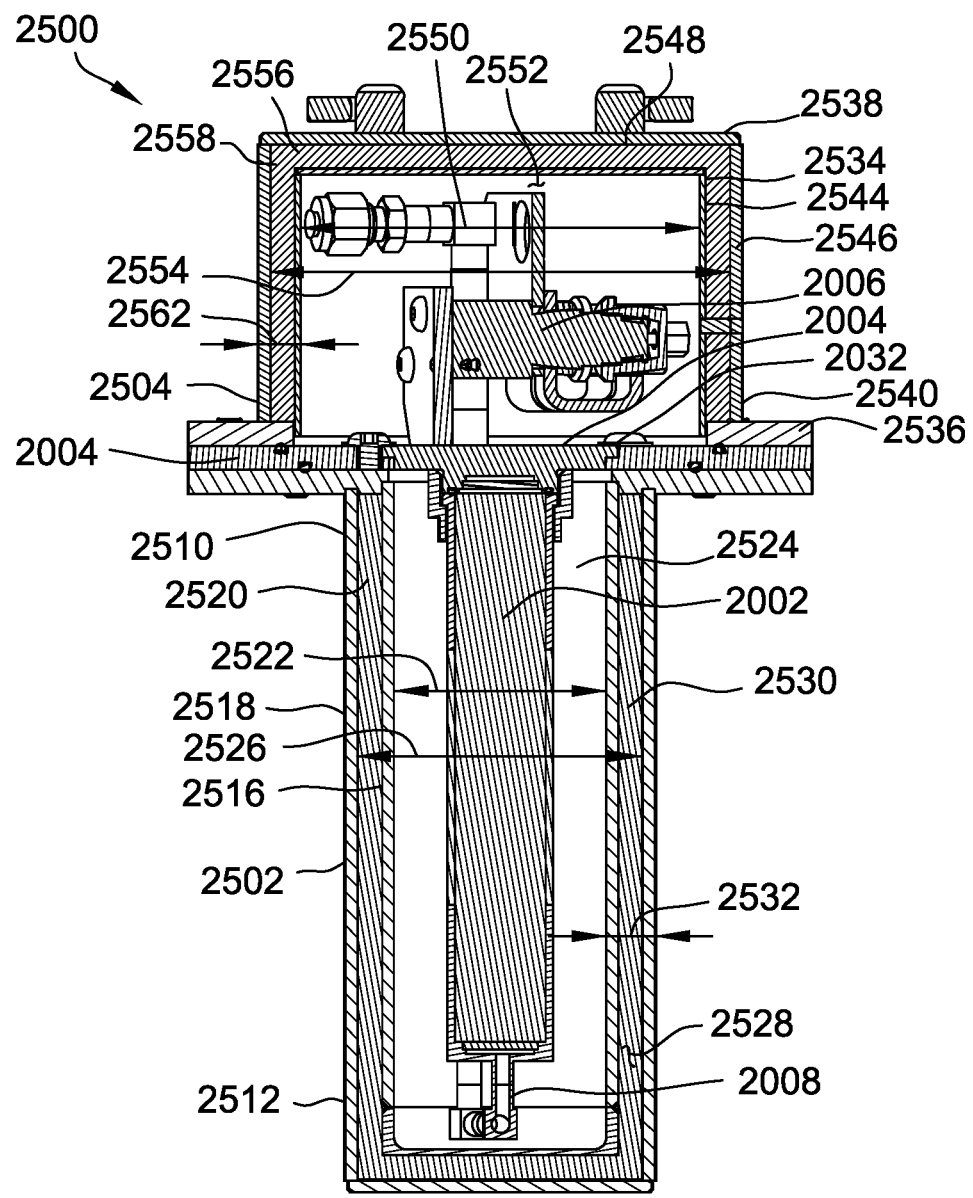
FIG. 18 is a sectional view of the example column transportation vessel taken along line 18-18 in FIG. 16.

In an alternative embodiment, the Xe-133 is stored within the activated charcoal 2018 rather than desorbing the Xe-133 and sending the desorbed Xe-133 to the coil assembly. In an example embodiment, the column assembly 2000 is incorporated into a column transportation vessel 2500. FIG. 16 is a perspective view of an example column transportation vessel 2500 incorporating the charcoal column assembly 2000. FIG. 17 is a perspective sectional view of the example column transportation vessel 2500 shown in FIG. 16. FIG. 18 is a schematic sectional view of the example column transportation vessel 2500 shown in FIG. 16. In addition to the column assembly 2000, the column transportation vessel 2500 also includes a first or bottom nuclear radiation shield 2502 and a second or top nuclear radiation shield 2504. In the example embodiment, the first nuclear radiation shield 2502 is removably attached to the first side 2030 of the column flange 2004, and the second nuclear shield 2504 is removably attached to the second side 2032 of the column flange 2004 such that the first and second nuclear shields 2502 and 2504 completely enclose the column assembly 2000.

The first nuclear radiation shield 2502 includes a first shielded portion 2506 and a first shield flange 2508. The first shielded portion 2506 includes a first end 2510 and a second end 2512. The first shield flange 2508 extends from the first end 2510 of the first shielded portion 2506 and defines a plurality of first shield fastener receptacles 2514. The first shielded portion 2506 also includes a first shield inner shell 2516, a first shield outer shell 2518, and a first shield shielding 2520. The first inner shield shell 2516 has a substantially cylindrical shape and defines a first shield inner shell diameter 2522 and a first shield inner cavity 2524 sized and shaped to receive the charcoal column 2002 and the outlet tube 2008 therein. The first shield outer shell 2518 has a substantially cylindrical shape and defines a first shield outer shell diameter 2526 and a first shield outer cavity 2528 sized and shaped to receive the first inner shield shell 2516 and the first shield shielding 2520 therein. The first shield outer shell diameter 2526 is larger than the first shield inner shell diameter 2522 such that a substantially cylindrical shielding volume 2530 is formed therebetween. The first shield shielding 2520 is positioned within the shielding volume 2530 and includes a first shield shielding thickness 2532. In the example embodiment, the first shielding thickness 2532 is in a range from about 1 mm to about 100 mm. More specifically, the first shielding thickness 2532 is in a range from about 5 mm to about 25 mm. More particularly, the first shielding thickness 2532 is about 5 mm. The first shield shielding 2520 is configured to shield the surrounding environment from nuclear radiation generated within the charcoal column 2002 by the stored Xe-133. In the example embodiment, the first shield shielding 2520 is made of lead.

The second nuclear radiation shield 2504 includes a second shielded portion 2534 and a second shield flange 2536. The second shielded portion 2534 includes a first end 2538 and a second end 2540. The second shield flange 2536 extends from the second end 2540 of the second shielded portion 2534 and defines a plurality of second shield fastener receptacles 2542 (not labeled). The second shielded portion 2534 also includes a second shield inner shell 2544, a second shield outer shell 2546, and a second shield shielding 2548. The second inner shield shell 2544 has a substantially cylindrical shape and defines a second shield inner shell diameter 2550 and a second shield inner cavity 2552 sized and shaped to receive the fluid control assembly 2006 therein. The second shield outer shell 2546 has a substantially cylindrical shape and defines a second shield outer shell diameter 2554 and a second shield outer cavity 2556 sized and shaped to receive the second inner shield shell 2544 and the second shield shielding 2548 therein. The second shield outer shell diameter 2554 is larger than the second shield inner shell diameter 2550 such that a substantially cylindrical shielding volume 2558 is formed therebetween. The second shield shielding 2548 is positioned within the shielding volume 2558 and includes a second shield shielding thickness 2562. In the example embodiment, the second shielding thickness 2562 is in a range from about 1 mm to about 100 mm. More specifically, the second shielding thickness 2562 is in a range from about 5 mm to about 25 mm. More particularly, the second shielding thickness 2562 is about 5 mm. The second shield shielding 2548 is configured to shield the surrounding environment from nuclear radiation generated within the charcoal column 2002 by the stored Xe-133. In the example embodiment, the second shield shielding 2548 is made of lead. The second nuclear radiation shield 2504 also includes a handle 2564 extending from the first end 2538 of the second nuclear radiation shield 2504.

In the illustrated embodiment, the first nuclear radiation shield 2502 is positioned on the first side 2030 of the column flange 2004 such that the charcoal column 2002 and the outlet tube 2008 are completely enclosed in the first nuclear radiation shield 2502. The second nuclear radiation shield 2504 is positioned on the second side 2032 of the column flange 2004 such that the fluid control assembly 2006 is completely enclosed within the second nuclear radiation shield 2504. Additionally, the first nuclear radiation shield 2502 and the second nuclear radiation shield 2504 are positioned such that the first shield fastener receptacles 2514 and the second shield fastener receptacles 2542 align. A plurality of fasteners 2566 are inserted though the first shield fastener receptacles 2514, the second shield fastener receptacles 2542, and the column flange 2004 to secure the first nuclear radiation shield 2502, the second nuclear radiation shield 2504, and the column flange 2004 to form the column transportation vessel 2500. The handle 2564 allows an operator to pick up and transport the column transportation vessel 2500.

Figure 19:
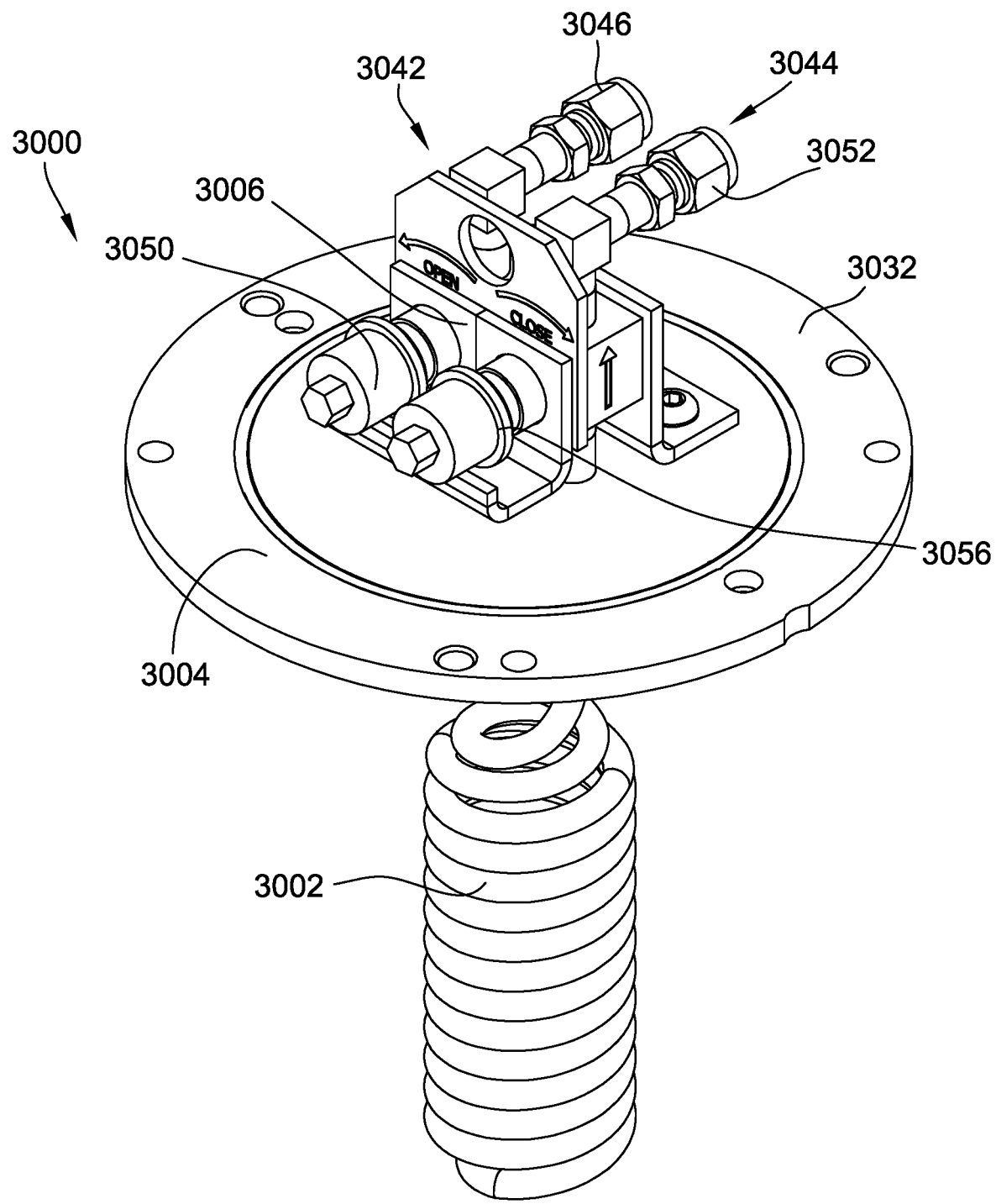
FIG. 19 is a top perspective view of an example coil assembly suitable for use in the system shown in FIG. 1 and the Xe-133 production processes described herein.
Figure 20:
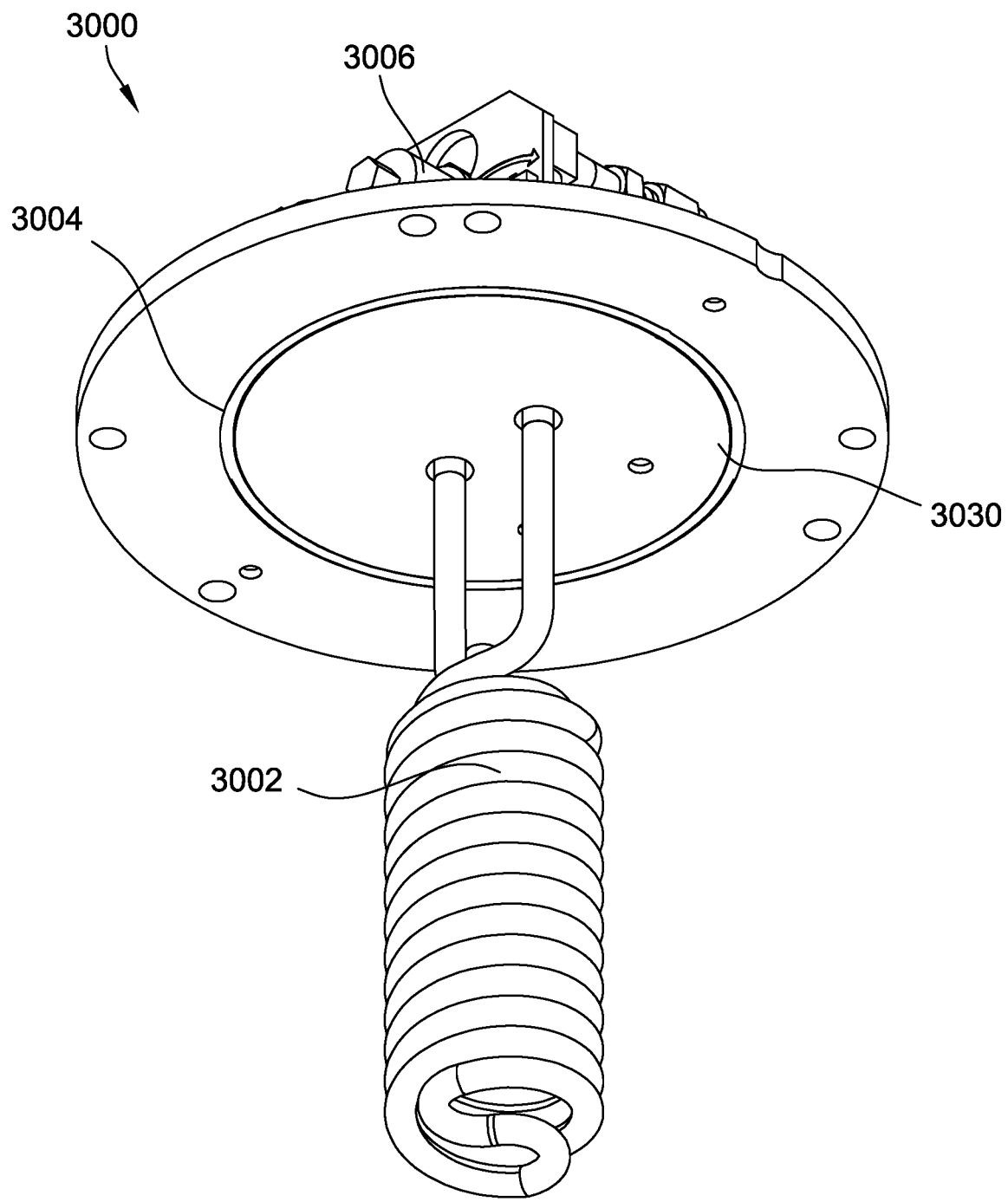
FIG. 20 is a bottom perspective view of the example coil assembly shown in FIG. 19.
Figure 21:
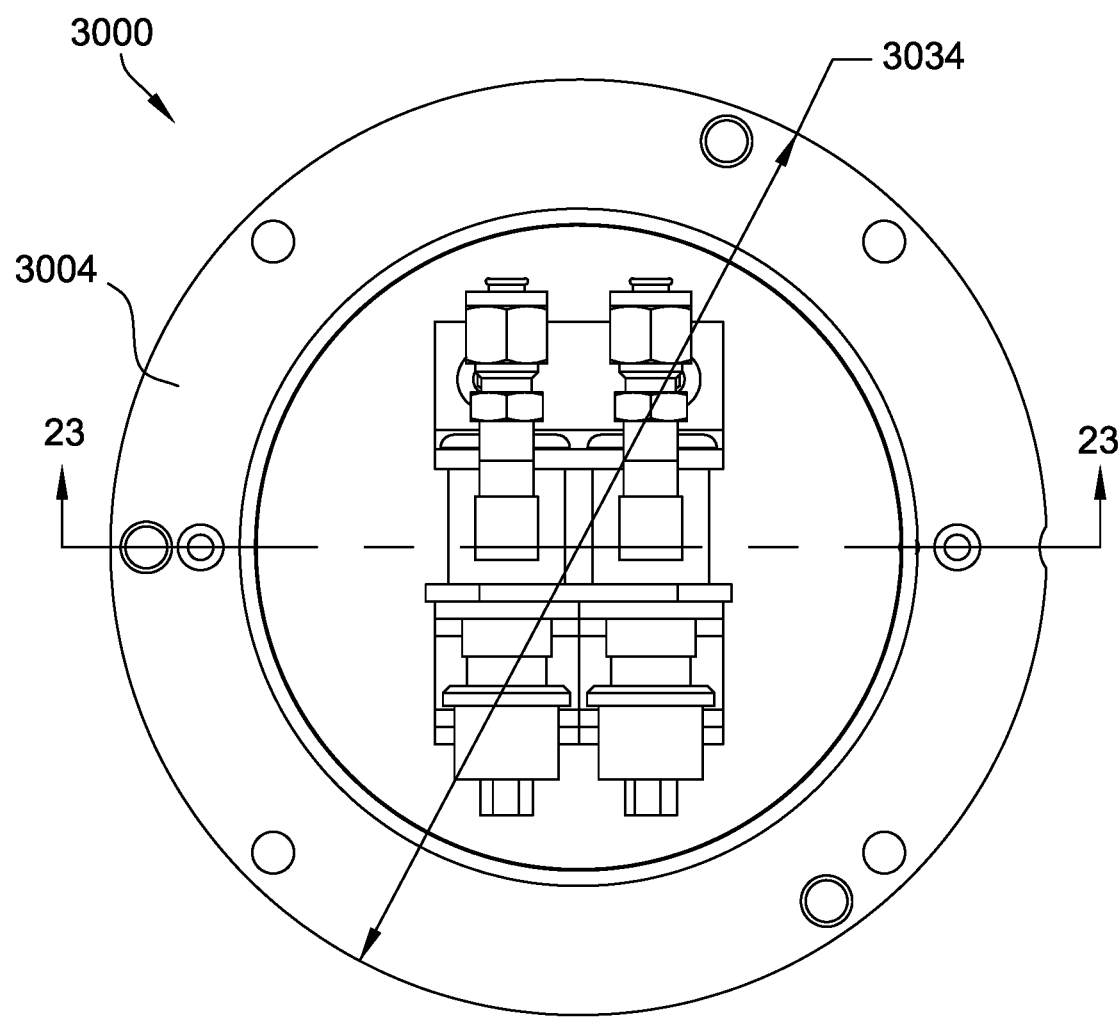
Figure 22:
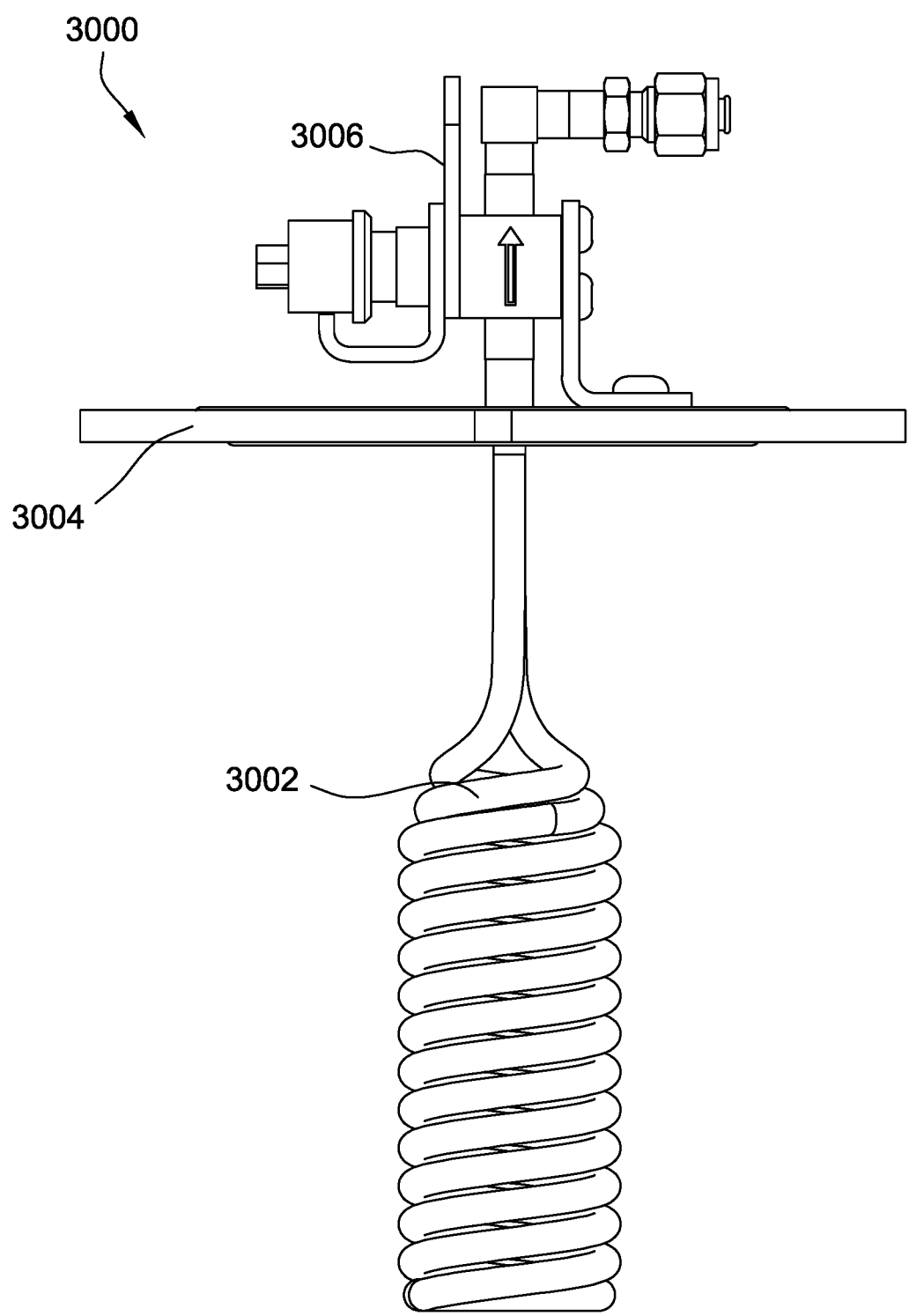
FIG. 22 is a side sectional view of the example coil assembly taken along line 23-23 in FIG. 21.
Figure 23:
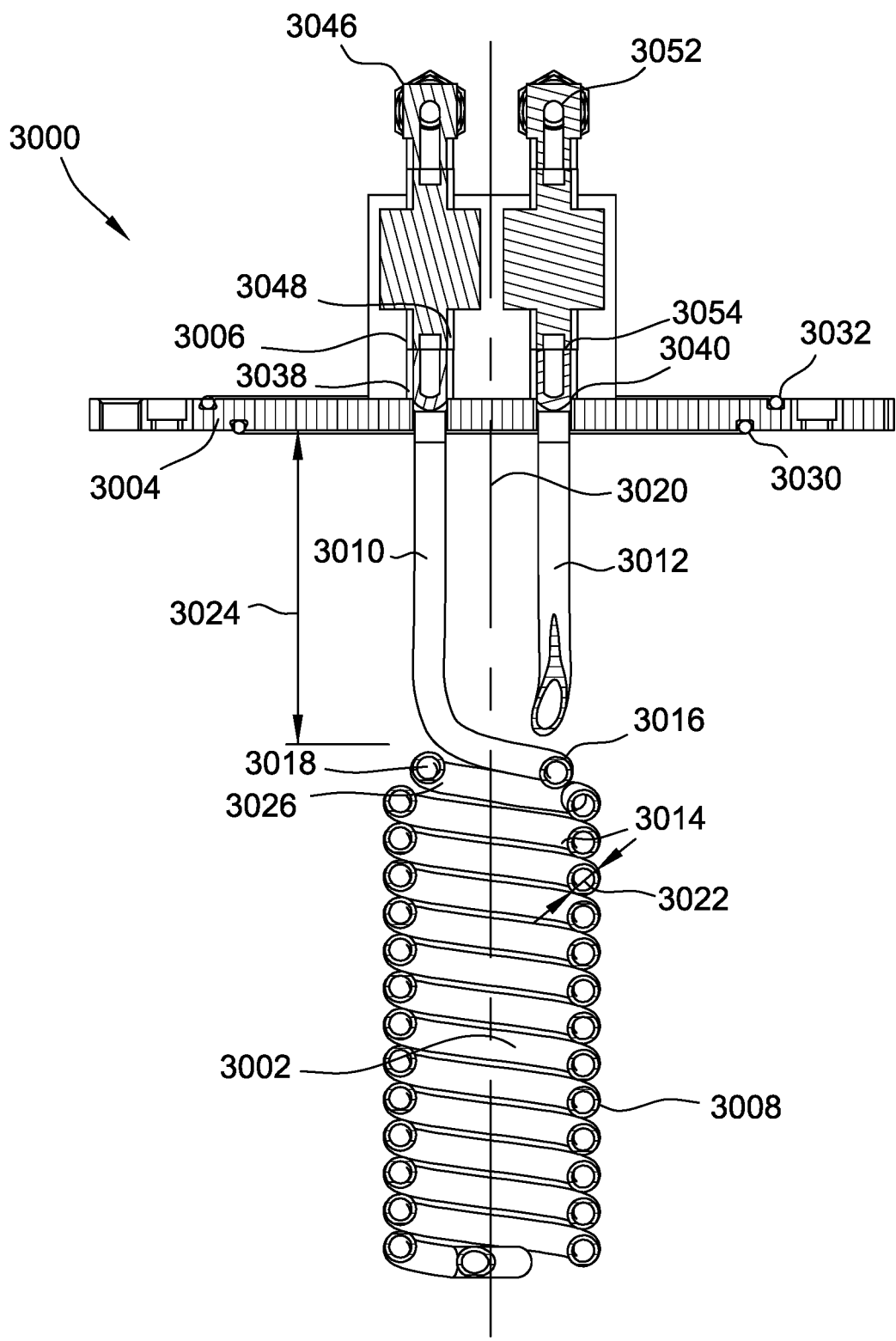
FIG. 23 is a side sectional view of the example coil assembly shown in FIG. 19.

FIG. 19 is a perspective view of an example coil assembly 3000 suitable for use in the glovebox 1000 and the Xe-133 production processes described herein. FIG. 20 is another perspective view of the example coil assembly 3000. FIG. 21 is a top view of the example coil assembly 3000 shown in FIG. 19. FIG. 22 is a side view of the example coil assembly 3000 shown in FIG. 19. FIG. 23 is a side sectional view of the example coil assembly 3000 shown in FIG. 19 taken along sectional line 23-23. The coil assembly 3000 is configured to freeze and/or condense Xe-133 desorbed from the charcoal column assembly 2000. The desorbed Xe-133 may also include Kr-85 and helium carrier gas. The coil assembly 3000 is specifically configured to separate the Xe-133 from the Kr-85 and the helium carrier gas by freezing and/or condensing the Xe-133, while allowing the Kr-85 and the helium carrier gas to pass through the coil assembly 3000. The Xe-133 is then stored in the coil assembly 3000 for further processing.

The coil assembly 3000 includes a coil 3002, a coil flange 3004, and a fluid control assembly 3006. The coil 3002 includes a coil tube 3008 that includes an inlet portion 3010, an outlet portion 3012, and a helical portion 3014. In the example embodiment, the inlet portion 3010 and the outlet portion 3012 are straight portions of the coil tube 3008. The helical portion 3014 includes an inlet or first helical portion 3016, and an outlet or second helical portion 3018 arranged in a double-helix configuration. The inlet portion 3010 is fluidly connected to the inlet helical portion 3016, which is fluidly connected to the outlet helical portion 3018. The outlet helical portion 3018 is fluidly connected to the outlet portion 3012. The inlet helical portion 3016 and the outlet helical portion 3018 are each individual helical tubes wound around the same central axis 3020 such that the inlet helical portion 3016 and the outlet helical portion 3018 form the double-helix configuration. The double-helix configuration increases the length of coil tube 3008 that is submerged within the liquid nitrogen. Accordingly, the double-helix configuration increases the volume of Xe-133 that may be stored and transported in the coil assembly 3000.

In the illustrated embodiment, the coil tube 3008 has a coil tube diameter 3022. In the example embodiment, the coil tube diameter 3022 is in a range from about 5 mm to about 10 mm. The inlet portion 3010 and the outlet portion 3012 each extend a first distance 3024 from the coil flange 3004 such that a top 3026 of the helical portion 3018 is positioned the first distance 3024 from the coil flange 3004. The first distance 3024 is long enough to maintain the helical portion 3018 submerged in liquid nitrogen in the Dewar flask 1074 during the desorption process. In the example embodiment, the first distance 3024 is in a range from about 20 mm to about 150 mm. More specifically, the first distance 3024 is in a range from about 50 mm to about 100 mm. More particularly, the first distance 3024 is about 75 mm.

The coil flange 3004 includes a first side or a bottom side 3030, a second side or a top side 3032, and a coil flange diameter 3034. The coil flange 3004 defines a coil flange inlet 3038 and a coil flange outlet 3040. The coil 3002 extends from the first side 3030 of the coil flange 3004. In the example embodiment, the coil flange diameter 3034 is in a range from about 100 mm to about 200 mm. More specifically, the coil flange diameter 3034 is in a range from about 150 mm to about 180 mm. More particularly, the coil flange diameter 3034 is about 165 mm.

The fluid control assembly 3006 is positioned on the second side 3032 of the coil flange 3004. The fluid control assembly 3006 includes a coil inlet assembly 3042 and a coil outlet assembly 3044. The coil inlet assembly 3042 includes an inlet connector 3046, an inlet tube 3048, and an inlet valve 3050. Similarly, the coil outlet assembly 3044 includes an outlet connector 3052, a control assembly outlet tube 3054, and an outlet valve 3056. The inlet connector 3046 and the outlet connector 3052 are configured to connect to an inlet conduit (not shown) and an outlet conduit (not shown), respectively. The inlet conduit is configured to channel a flow of off gas, including Xe-133 and Kr-85, to the inlet connector 3046 and the coil assembly 3000. The outlet conduit is configured to channel the remaining (i.e., uncondensed) flow of gas from the outlet connector 3052 and the coil assembly 3000. The inlet tube 3048 is fluidly connected to the inlet connector 3046 and the inlet portion 3010. The inlet tube 3048 extends through the coil flange inlet 3038 to the inlet portion 3010. The inlet valve 3050 is attached to the inlet tube 3048 and controls the flow of off gas into the coil 3002. The control assembly outlet tube 3054 is fluidly connected to the outlet connector 3052 and the outlet portion 3012. The control assembly outlet tube 3054 extends through the coil flange outlet 3040 to the outlet portion 3012. The outlet valve 3056 is attached to the control assembly outlet tube 3054 and controls the flow of off gas from the coil 3002. In the example embodiment, both the inlet valve 3050 and the outlet valve 3056 are plug valves. In alternative embodiments, the inlet valve 3050 and the outlet valve 3056 may be any type of valve that enables the coil assembly 3000 and the Xe-133 production processes to operate as described herein.

During operations, the coil assembly 3000 is positioned in the Dewar flask 1074 such that the helical portion 3018 is completely submerged within liquid nitrogen. The liquid nitrogen lowers the temperature of the helical portion 3018 to within a range from about −220° C. to about −180° C. More particularly, the liquid nitrogen lowers the temperature of the helical portion 3018 to about −196° C. The inlet conduit (not shown) channels the flow of desorbed Xe-133 to the coil inlet assembly 3042, which channels the flow of desorbed Xe-133 to the coil 3002. The desorbed Xe-133 is channeled through the coil 3002, where Xe-133 condenses and/or freezes within helical portion 3014. The unfrozen Kr-85 and helium carrier gases are channeled from the coil 3002 through the outlet portion 3014 to the coil outlet assembly 3044. The coil outlet assembly 3044 channels the unfrozen Kr-85 and helium carrier gases to the outlet conduit (not shown).

Figure 24:
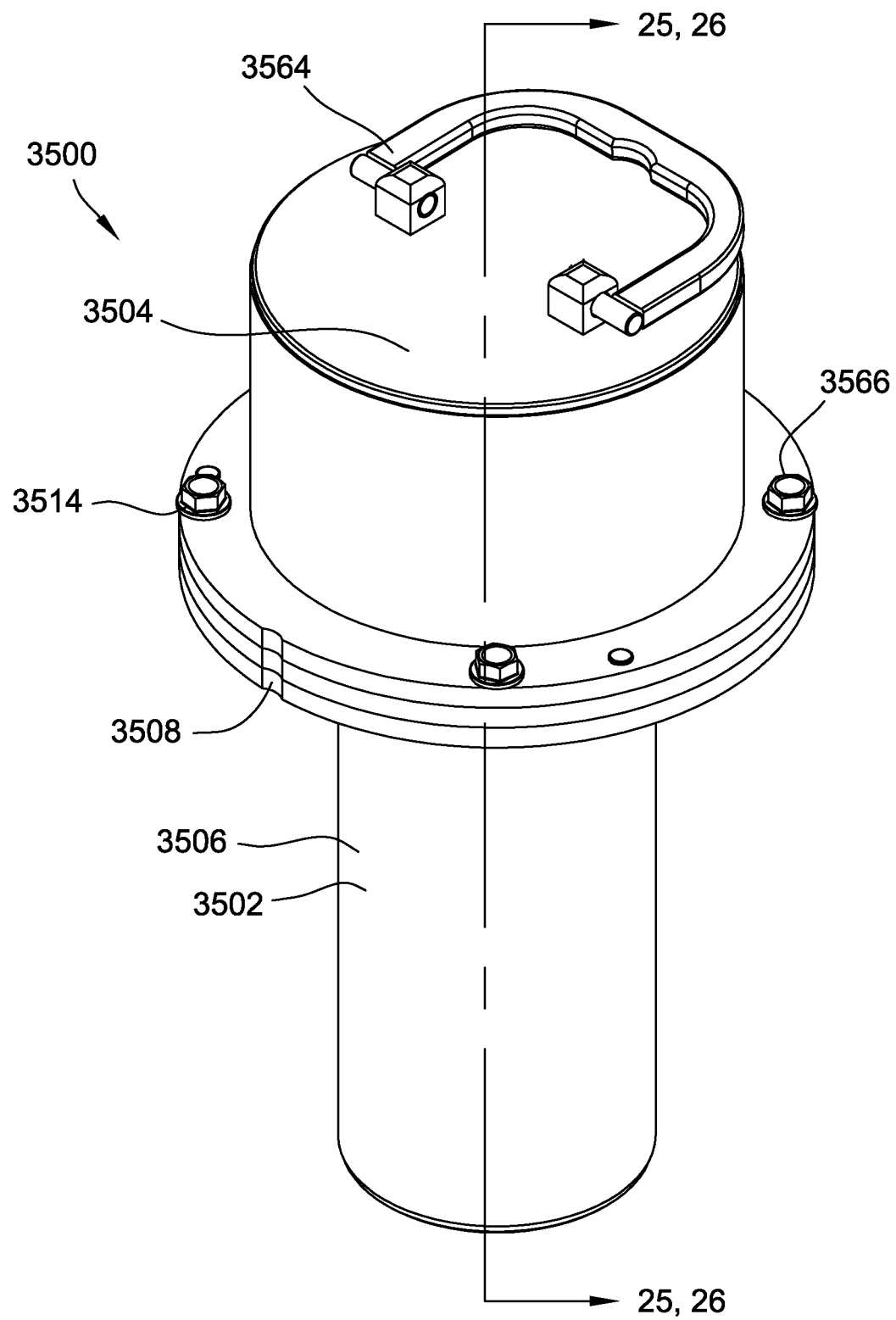
FIG. 24 is a perspective view of an example coil transportation vessel suitable for use with the coil assembly shown in FIG. 19.
Figure 25:
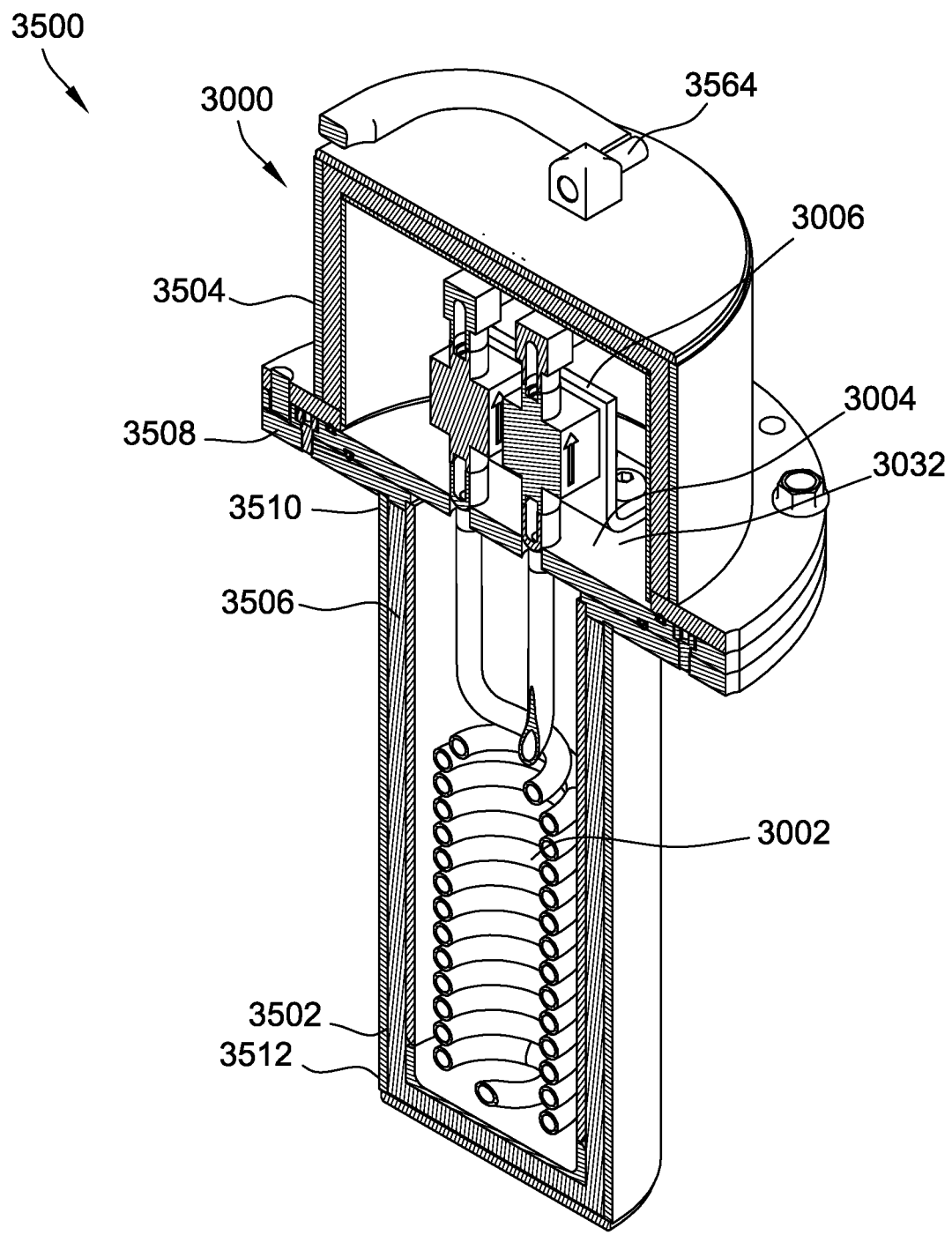
FIG. 25 is a perspective sectional view of the example coil transportation vessel taken along line 25-25 in FIG. 24.
Figure 26:
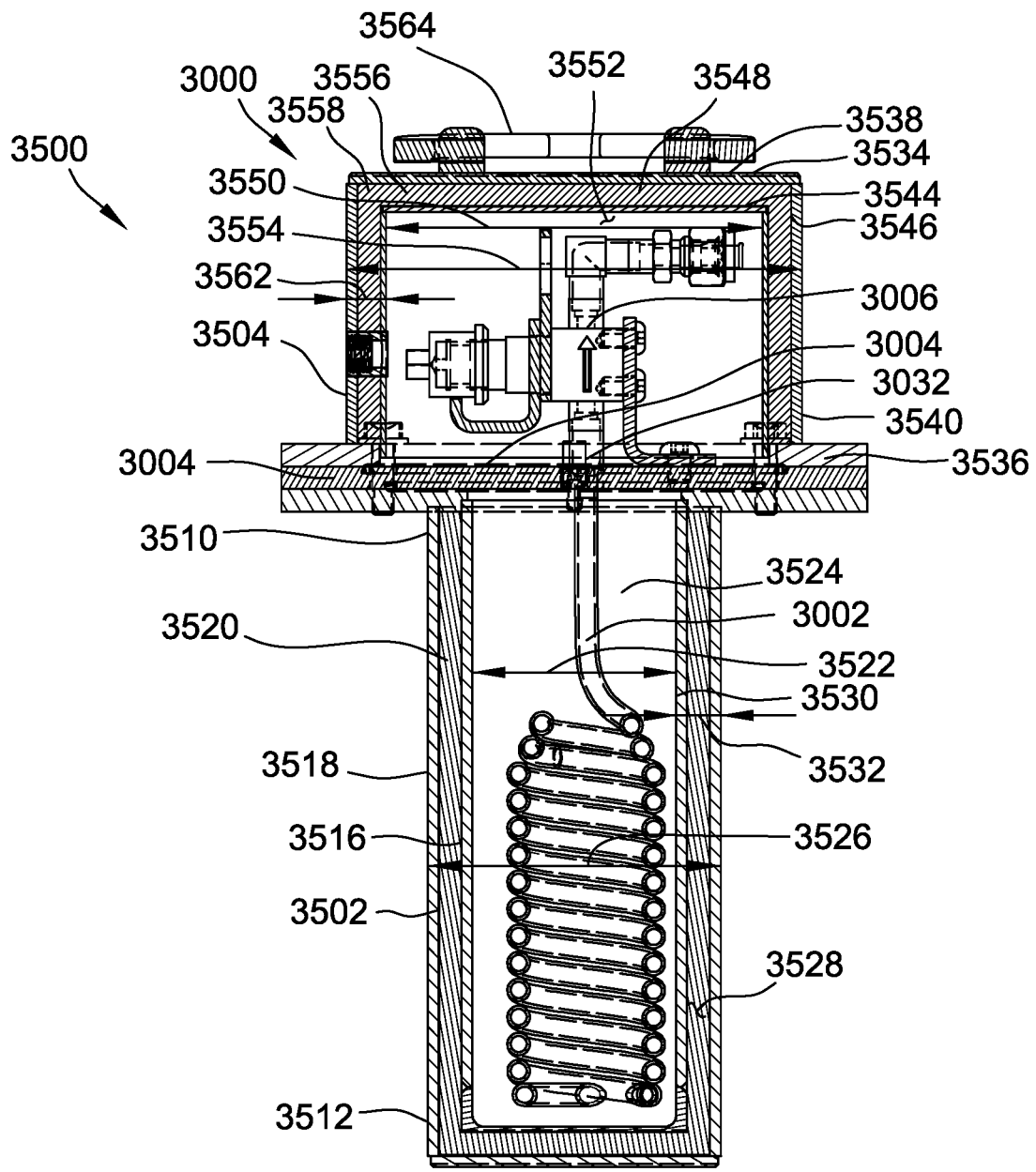
FIG. 26 is a schematic sectional view of the example coil transportation vessel taken along line 26-26 in FIG. 24.

After the entire volume of Xe-133 has been condensed and/or frozen in the coil 3002, the inlet valve 3050 and the outlet valve 3056 are closed and the coil assembly 3000 is positioned within a coil transportation vessel, such as coil transportation vessel 3500. FIG. 24 is a perspective view of an example coil transportation vessel 3500 with the coil assembly 3000 positioned therein. FIG. 25 is a perspective sectional view of the example coil transportation vessel 3500 shown in FIG. 24. FIG. 26 is a sectional view of the example coil transportation vessel 3500 shown in FIG. 24. The coil transportation vessel 3500 includes a first or bottom nuclear radiation shield 3502 and a second or top nuclear radiation shield 3504. In the example embodiment, the first nuclear radiation shield 3502 is removably attached to the first side 3030 of the coil flange 3004, and the second nuclear shield 3504 is removably attached to the second side 3032 of the coil flange 3004 such that the first and second nuclear shields 3502 and 3504 completely enclose the coil assembly 3000.

The first nuclear radiation shield 3502 includes a first shielded portion 3506 and a first shield flange 3508. The first shielded portion 3506 includes a first end 3510 and a second end 3512. The first shield flange 3508 extends from the first end 3510 of the first shielded portion 3506 and defines a plurality of first shield fastener receptacles 3514. The first shielded portion 3506 also includes a first shield inner shell 3516, a first shield outer shell 3518, and a first shield shielding 3520. The first inner shield shell 3516 has a substantially cylindrical shape and defines a first shield inner shell diameter 3522 and a first shield inner cavity 3524 sized and shaped to receive the coil 3002 therein. The first shield outer shell 3518 has a substantially cylindrical shape and defines a first shield outer shell diameter 3526 and a first shield outer cavity 3528 sized and shaped to receive the first inner shield shell 3516 and the first shield shielding 3520 therein. The first shield outer shell diameter 3526 is larger than the first shield inner shell diameter 3522 such that a substantially cylindrical shielding volume 3530 is formed therebetween. The first shield shielding 3520 is positioned within the shielding volume 3530 and includes a first shield shielding thickness 3532. In the example embodiment, the first shielding thickness 3532 is in a range from about 10 mm to about 100 mm. More specifically, the first shielding thickness 3532 is in a range from about 25 mm to about 75 mm. More particularly, the first shielding thickness 3532 is about 50 mm. The first shield shielding 3520 is configured to shield the surrounding environment from nuclear radiation generated within the coil 3002 by the stored Xe-133. In the example embodiment, the first shield shielding 3520 is made of lead.

The second nuclear radiation shield 3504 includes a second shielded portion 3534 and a second shield flange 3536. The second shielded portion 3534 includes a first end 3538 and a second end 3540. The second shield flange 3536 extends from the second end 3540 of the second shielded portion 3534 and defines a plurality of second shield fastener receptacles (not labeled). The second shielded portion 3534 also includes a second shield inner shell 3544, a second shield outer shell 3546, and a second shield shielding 3548. The second inner shield shell 3544 has a substantially cylindrical shape and defines a second shield inner shell diameter 3550 and a second shield inner cavity 3552 sized and shaped to receive the fluid control assembly 3006 therein. The second shield outer shell 3546 has a substantially cylindrical shape and defines a second shield outer shell diameter 3554 and a second shield outer cavity 3556 sized and shaped to receive the second inner shield shell 3544 and the second shield shielding 3548 therein. The second shield outer shell diameter 3554 is larger than the second shield inner shell diameter 3550 such that a substantially cylindrical shielding volume 3558 is formed therebetween. The second shield shielding 3548 is positioned within the shielding volume 3560 and includes a second shield shielding thickness 3562. In the example embodiment, the second shielding thickness 3562 is in a range from about 10 mm to about 100 mm. More specifically, the second shielding thickness 3562 is in a range from about 25 mm to about 75 mm. More particularly, the second shielding thickness 3562 is about 50 mm. The second shield shielding 3548 is configured to shield the surrounding environment from nuclear radiation generated within the coil 3002 by the stored Xe-133. In the example embodiment, the second shield shielding 3548 is made of lead. The second nuclear radiation shield 3504 also includes a handle 3564 extending from the first end 3538 of the second nuclear radiation shield 3504.

In the illustrated embodiment, the first nuclear radiation shield 3502 is positioned on the first side 3030 of the coil flange 3004 such that the coil 3002 is completely enclosed in the first nuclear radiation shield 3502. The second nuclear radiation shield 3504 is positioned on the second side 3032 of the coil flange 3004 such that the fluid control assembly 3006 is completely enclosed within the second nuclear radiation shield 3504. Additionally, the first nuclear radiation shield 3502 and the second nuclear radiation shield 3504 are positioned such that the first shield fastener receptacles 3514 and the second shield fastener receptacles 3542 align. A plurality of fasteners 3566 are inserted though the first shield fastener receptacles 3514, the second shield fastener receptacles 3542, and the coil flange 3004 to secure the first nuclear radiation shield 3502, the second nuclear radiation shield 3504, and the coil flange 3004 to form the coil transportation vessel 3500. The handle 3564 allows an operator to pick up and transport the coil transportation vessel 3500.

Embodiments of the Xe-133 production systems and methods described herein provide several advantages over known systems, as described in the above examples.

Examples

The following examples are non-limiting.

Six tests were carried out using a dry gas stream made up of 80 parts per million by volume (ppmV) Xenon gas and 16 ppmV Krypton gas. The remainder of the gas was made up of Helium, $CO_2$, and $N_2$. The composition of the dry gas stream was selected to simulate the off gas from a Mo-99 production process using LEU.

In each test, the gas mixture was directed through a system for producing Xe-133 substantially similar to the system 100 shown and described above with reference to FIG. 1 to separate and collect Xenon gas from the gas mixture. The final amount of Xenon recovered in the coil assembly was measured, and is reported in the below table. During testing, the gas stream was not directed through a zeolite column because the gas stream was dry (i.e., substantially free of water vapor). The system used in the tests included a charcoal column assembly containing 32 g of Norit® RB1 charcoal, and a $CO_2$ removal column containing 130 g of Ascarite® sodium hydroxide-coated silica. The charcoal column assembly had substantially the same configuration as the charcoal column assembly 2000 shown and described above with reference to FIGS. 11-15. Prior to the Xenon collection tests, the charcoal was subjected to a pre-treatment by heating the charcoal overnight at a temperature of 85° C. while subjecting the charcoal to a flow of Helium gas of 120 NmL/min.

Each test included an adsorption step and a desorption step. In the adsorption step for each test, the gas mixture was directed, in series, through the $CO_2$ column assembly containing Ascarite® sodium hydroxide-coated silica and the charcoal column assembly. The Ascarite® sodium hydroxide-coated silica was at room temperature, and the temperature of the charcoal column assembly was regulated to a target temperature of 3° C. The gas mixture was directed through the $CO_2$ column assembly and the charcoal column assembly at a flow rate of 1.5 NL/min.

In the desorption step for each test, the charcoal column assembly was disconnected from the supply of gas mixture, sealed, and heated to a temperature of 85° C. Following a pre-heating time of 40 minutes, the charcoal column assembly was connected to a coil assembly submerged in a liquid $N_2$ bath within a Dewar vessel. The coil assembly was submerged in the liquid $N_2$ bath for a pre-cooling period of 1 hour prior to being connected to the charcoal column assembly. The coil assembly used in testing had substantially the same configuration as the coil assembly 3000 shown and described above with reference to FIGS. 19-23.

A Helium carrier gas was then directed, in series, through the heated charcoal column assembly and through the cooled coil assembly such that Xenon was desorbed from the charcoal column assembly and condensed in the cooled coil assembly. Each test used one of three different flow rates for the carrier gas: 140 NmL/min, 160 NmL/min, or 180 NmL/min. Two tests were carried out at each of the identified carrier gas flow rates. The carrier gas flow was carried out for no more than 80 minutes in each test. Results from each test are reported in the table below.

| Test | Charcoal capacity for Xe during adsorption (NTP μmoles/g charcoal) | Charcoal capacity for Kr during adsorption (NTP μmoles/g charcoal) | Desorption Flow Rate (NmL/min) |
|---|---|---|---|
| 1 | 9.7 | 0.23 | 140 |
| 2 | 9.8 | 0.23 | 160 |
| 3 | 9.6 | 0.23 | 180 |
| 4 | 9.9 | 0.23 | 140 |
| 5 | 9.8 | 0.23 | 160 |
| 6 | 9.0 | 0.23 | 180 |

| Test | Xe concentration in the final product (ppmV) | Kr concentration in the final product (ppmV) | Final Xe Recovery at coil assembly(%) |
|---|---|---|---|
| 1 | 24698 | <LOD | 93.2 |
| 2 | 24126 | <LOD | 97.5 |
| 3 | 18858 | <LOD | 86.0 |
| 4 | 28377 | <LOD | 105.0 |
| 5 | 25127 | 28 | 99.2 |
| 6 | 25127 | <LOD | 99.2 |

The charcoal capacity for Xenon and Krypton during adsorption was measured by following the breakthrough curve with a Mass spectrometry. The units are reported in Normal temperature and pressure (NTP) conditions of micromoles (μmoles) per gram charcoal. The Xenon and Krypton concentration in the final product was measured by gas chromatography, with the limit of detection (LOD) for Krypton being 2 ppm. The final Xe recovery percentage was calculated by dividing the total amount of Xe recovered at the coil by the amount of Xe adsorbed on the activated charcoal column assembly for a given test.

As shown in the table above, the Xenon yield using the systems and methods described herein is relatively high. In particular, the experimental tests resulted in a yield of Xenon in excess of 90% in 4 of 6 tests, in excess of 97% in 3 of 6 tests, and in excess of 99% in 2 of 6 tests. The yield percentage greater than 100% in test 4 is believed to be the result of experimental and/or measurement error.

Three production tests were also carried out using an off gas from a Mo-99 production process in which low-enriched Uranium targets were irradiated to produce a fission gas. The production tests were carried out using a system having substantially the same configuration as the system 100 shown and described above with reference to FIG. 1. The length of irradiation and resulting activity range of the produced Mo-99 for each production test are reported in the table below.

| Test No. | 1 | 2 | 3 |
|---|---|---|---|
| Length of Irradiation (hours) | 168 | 114 | 138 |
| Activity Range (Mo-99 yield in terabecquerel (TBq)) | 26.86 | 41.97 | 41.07 |

For each production test, the off gas generated during the Mo-99 production process was transferred and stored in a vacuum tank outside the hot cell where the Mo-99 production process was carried out. At this stage, the off-gas included primarily Helium, Xenon isotopes, and Krypton isotopes, and was the raw material used in the production tests to produce Xe-133. The off gas was analyzed using Gamma Spectroscopy at two different decay times for each production test. The results of the off gas analysis are reported in the table below.

| Test No. | Decay Time (days) | Nuclide | Yield % | Activity (kBq/unit) (measuring time) | Statistical Uncertainty | Activity in kBq/bar/l (ref. time) |
|---|---|---|---|---|---|---|
| 1 | 5.04 | Xe-131m | 9.96E−01 | 9.12E+00 | 1.13E+00 | 3.51E+05 |
|   |   | Xe-133 | 1.00E+00 | 7.15E+03 | 7.28E+02 | 3.99E+08 |
|   |   | Xe-133m | 9.91E−01 | 1.28E+02 | 1.09E+01 | 1.81E+07 |
|   |   | Xe-135 | 0.944 | 1.83E+00 | 1.54E−01 | 5.12E+08 |
| 2 | 10 | Xe-131m | 9.89E−01 | 5.18E+01 | 5.45E+00 | 3.58E+05 |
|   |   | Xe-133 | 1.00E+00 | 2.97E+04 | 3.02E+03 | 4.27E+08 |
|   |   | Xe-133m | 9.91E−01 | 2.11E+02 | 1.80E+01 | 1.92E+07 |
|   |   | Xe-135 | NA | NA | NA | NA |
| 3 | 5.03 | Xe-131m | 9.88E−01 | 6.42E+01 | 6.74E+00 | 7.31E+05 |
|   |   | Xe-133 | 1.00E+00 | 4.52E+04 | 4.60E+03 | 7.45E+08 |
|   |   | Xe-133m | 9.89E−01 | 9.01E+02 | 7.70E+01 | 3.75E+07 |
|   |   | Xe-135 | 8.79E−01 | 5.36E+01 | 4.39E+00 | 1.25E+06 |
| 1 | 32 | Xe-131m | 1.00E+00 | 1.09E+01 | 1.22E+00 | 3.29E+05 |
|   |   | Xe-133 | 1.00E+00 | 1.29E+03 | 1.31E+02 | 4.08E+08 |
|   |   | Xe-133m | Not resolved | Not resolved | Not resolved | Not resolved |
|   |   | Xe-135 | Not resolved | Not resolved | Not resolved | Not resolved |
| 2 | 31 | Xe-131m | 1.00E+00 | 1.43E+01 | 1.53E+00 | 3.59E+05 |
|   |   | Xe-133 | 1.00E+00 | 1.78E+03 | 1.81E+02 | 4.37E+08 |
|   |   | Xe-133m | 1.00E+00 | 2.52E−01 | 8.11E−02 | 1.87E+07 |

-continued

| Test No. | Decay Time (days) | Nuclide | Yield % | Activity (kBq/unit) (measuring time) | Statistical Uncertainty | Activity in kBq/bar/l (ref. time) |
|---|---|---|---|---|---|---|
| | | Xe-135 | Not resolved | Not resolved | Not resolved | Not resolved |
| 3 | 31 | Xe-131m | 1.00E+00 | 8.06E+00 | 1.02E+00 | 5.13E+05 |
| | | Xe-133 | 1.00E+00 | 1.13E+03 | 1.15E+02 | 6.71E+08 |
| | | Xe-133m | Not resolved | Not resolved | Not resolved | Not resolved |
| | | Xe-135 | Not resolved | Not resolved | Not resolved | Not resolved |

Following a cool down period of at least 24 hours, the off gas was directed, by a vacuum pump, through a condenser, a particle filter, and a zeolite column assembly to remove fluids (e.g., water) and particles. The particle filter included a porous sintered metal media having a porosity of 2 microns or less. The zeolite column assembly included a mass of zeolite of about 16 g. The off gas was then directed towards the vacuum pump and, pressure controlled at the discharge end of the vacuum pump, directed through a water indicator and a secondary zeolite column assembly having substantially the same configuration as the first zeolite column assembly. The lack of water vapor in the off gas was verified by visually inspecting the water indicator and confirming no change in the appearance of the water indicator.

The off gas was then directed to a Xenon collection glovebox having substantially the same configuration as the glovebox 1000 shown and described above with reference to FIGS. 2-10. In the Xenon collection glovebox, the off gas was first directed through a $CO_2$ removal column assembly containing a mass of Ascarite® sodium-hydroxide coated silicon dioxide of about 130 g. The off gas was then directed through a charcoal column assembly having substantially the same configuration as the charcoal column assembly 2000 shown and described above with reference to FIGS. 11-15. The charcoal column assembly included a mass of 32 g of Norit® RB1 charcoal, which was subjected to a pre-treatment by heating the charcoal overnight at a temperature of 85° C. while subjecting the charcoal to a flow of Helium gas of 120 NmL/min. The charcoal column assembly was controlled at a reduced temperature while the off gas passed therethrough to provide selective adsorption of Xenon on the charcoal column assembly. The adsorption time and the parameters at the beginning, middle, and end of the adsorption step for each production test are reported in the below table.

| Test No. | Adsorption Time (minutes) | Charcoal Column Temp. (start/middle/end) (° C.) | Off Gas Supply Pressure (start/middle/end) (bar(g)) | Off Gas Flow Rate (start/middle/end) (NmL/min) |
|---|---|---|---|---|
| 1 | 60 | 0/0/0 | 0.5/0.5/0.5 | 1500/1500/1500 |
| 2 | 30 | 0/0/0 | 0.5/0.5/0.5 | 1501/1500/1500 |
| 3 | 45 | 0/0/0 | 0.5/0.6/0.6 | 1500/1500/1500 |

Following adsorption, the loaded charcoal column assembly was disconnected from the off gas supply line, and stored for a maximum decay period of 7 days. Following the decay period, the charcoal column assembly was heated to a temperature of about 101° C. within the Xenon collection glovebox, and connected to a Helium carrier gas supply system to desorb Xenon adsorbed onto the charcoal assembly. The charcoal column assembly was also connected to a cooled coil assembly, also within the Xenon collection glovebox. The coil assembly had substantially the same configuration as the coil assembly 3000 shown and described above with reference to FIGS. 19-23. The coil assembly was submerged in a liquid $N_2$ bath within a Dewar flask and allowed to cool for a suitable pre-cooling period (e.g., 1 hour) before the flow of Helium gas was started. After suitable pre-heating and pre-cooling periods for the charcoal column assembly and the coil assembly, respectively, the Helium carrier gas was directed, in series, through the heated charcoal column assembly and through the cooled coil assembly such that Xenon was desorbed from the charcoal column assembly and condensed in the cooled coil assembly. The carrier gas flow was carried out for no more than 80 minutes in each test. The Helium gas supply pressure and flow rate, and the temperature of the charcoal column assembly at the beginning, middle, and end of the desorption step for each test are reported in the table below.

| Test No. | He Supply Pressure (start/middle/end) (bar(g)) | Charcoal Column Temp, (start/middle/end) (° C.) | He Gas Flow Rate (start/middle/end) (NmL/min) |
|---|---|---|---|
| 1 | 0.1/0.1/0.1 | 101/101/101 | 163/165/165 |
| 2 | 0.1/0.1/0.1 | 101/101/101 | 180/165/165 |
| 3 | 0.1/0.1/0.1 | 101/101/101 | 180/165/165 |

Following the desorption step, the coil assembly was evacuated to remove Helium carrier gas from the coil assembly while the coil assembly was submerged in the liquid $N_2$ bath. After evacuation, the coil assembly was sealed and allowed to reach ambient temperature, and the activity of Xenon gas collected in the coil assembly was measured using an ionization chamber. The Xenon activity levels from each test are reported in the table below.

| Test No. | Radioactivity Level (Ci) |
|---|---|
| 1 | 93.35 |
| 2 | 46.5 |
| 3 | 90.12 |

Samples were then collected from each coil assembly, and analyzed to measure the quality and radionuclide purity of the Xenon gas collected in the coil assembly. The appearance of each sample was visually inspected to confirm the samples were clear and colorless. The identity of the Xenon gas of each sample was confirmed using Gamma Spectrometry to identify major peaks at 31 KeV (X-ray) and 81 KeV. The radionuclidic purity of each sample (based on the percentage of the sample made up of radioxenons (Xe-133, Xe-133m, and Xe-131m)) was also measured using Gamma Spectrometry. Results from each production test are reported below.

| Test No. | 1 | 2 | 3 |
|---|---|---|---|
| Appearance | Clear and colorless | Clear and colorless | Clear and colorless |
| Radionuclide Identification | Peaks at 31 KeV and 81 KeV | Peaks at 31 KeV and 81 KeV | Peaks at 31 KeV and 81 KeV |
| Total Radioactivity at activity reference time (TBq) | 4.35 | 1.79 | 3.24 |
| Radionuclidic Purity at activity reference time (as radioxenons) | >99.9% | >99.9% | >99.9% |
| Xe-133m | 0.22% | 0.22% | 0.22% |
| Xe-131m | 0.19% | 0.19% | 0.19% |
| Kr-85 | <0.008% | <0.005% | <0.007% |
| I-131 | <0.001% | <0.003% | <0.005% |

As shown in the table above, each production test resulted in high purity Xenon-133 having a purity of radioxenons (i.e., Xe-133, Xe-133m, and Xe-131m) of at least 99.9%. In some embodiments, the system and methods of the present disclosure may be used to produce Xe-133 gas having a minimum purity of 99.9% of radioxenons, with Xe-133m less than or equal to 0.6%, Xe-131m less than or equal to 1.0%, and all other radioactive impurities (e.g., Kr-85 and I-131) less than 0.1%, with Kr-85 less than or equal to 0.03%, I-131 less than or equal to 0.01%, and all other impurities less than or equal to 0.06%.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method for producing Xenon-133 comprising:
   collecting an off gas from a Molybdenum-99 production process in a storage tank, the off gas including Xenon-133 and Krypton-85;
   selectively adsorbing Xenon-133 from the off gas onto a charcoal column assembly such that Xenon-133 is selectively adsorbed onto the charcoal column assembly relative to Krypton-85;
   desorbing the Xenon-133 from the charcoal column assembly by heating the charcoal column assembly; and
   condensing the Xenon-133 within a coil assembly.

2. The method of claim 1 further comprising evacuating the coil assembly while the Xenon-133 is condensed within the coil assembly.

3. The method of claim 2 further comprising:
   sealing the coil assembly after the coil assembly is evacuated; and
   allowing the coil assembly to reach ambient temperature such that condensed Xenon-133 within the coil assembly evaporates into gaseous Xenon-133 within the coil assembly.

4. The method of claim 1 further comprising removing water vapor from the off gas prior to selectively adsorbing the Xenon-133 onto the charcoal column assembly, wherein removing water vapor from the off gas includes passing the off gas through a zeolite column assembly.

5. The method of claim 1 further comprising removing carbon dioxide from the off gas prior to selectively adsorbing the Xenon-133 onto the charcoal column assembly, wherein removing carbon dioxide from the off gas includes passing the off gas through a column assembly containing sodium-hydroxide coated silicon dioxide.

6. The method of claim 1, wherein collecting an off gas from a Molybdenum-99 production process includes collecting the off gas from low-enriched uranium targets.

7. The method of claim 1, wherein selectively adsorbing Xenon-133 from the off gas onto a charcoal column assembly includes:
   cooling the charcoal column assembly to a temperature in the range of −5° C. to 10° C.; and
   directing the off gas through the cooled charcoal column assembly.

8. The method of claim 1, wherein desorbing the Xenon-133 from the charcoal column assembly includes heating the charcoal column assembly to a temperature of at least 70° C.

9. The method of claim 1, wherein condensing the Xenon-133 within a cooled coil assembly includes:
   cooling the coil assembly to a temperature less than −150° C.; and
   passing the off gas through the cooled coil assembly while the coil assembly is at a temperature of less than −150° C.

10. A method for producing Xenon-133 comprising:
    collecting an off gas from a Molybdenum-99 production process in a storage tank, the off gas including Xenon-133 and Krypton-85;
    directing the off gas through a cooled charcoal column assembly such that Xenon-133 is selectively adsorbed onto the charcoal column assembly relative to Krypton-85;
    heating the charcoal column assembly to a sufficient temperature to desorb the Xenon-133 from the charcoal column assembly;
    flowing a carrier gas through the heated charcoal column assembly such that the Xenon-133 is desorbed from the charcoal column assembly; and
    directing the carrier gas and the desorbed Xenon-133 through a cooled coil assembly such that the Xenon-133 condenses within the coil assembly.

11. The method of claim 10 further comprising evacuating the cooled coil assembly while the Xenon-133 is condensed within the coil assembly by:
    fluidly connecting an outlet of the coil assembly to a vacuum source; and
    fluidly connecting a flow restrictor between the outlet of the coil assembly and the vacuum source.

12. The method of claim 11, wherein the flow restrictor includes one of a restrictor orifice and a needle valve.

13. The method of claim 10 further comprising fluidly connecting an outlet of the coil assembly to a vacuum source to evacuate the cooled coil assembly while the Xenon-133 is condensed within the coil assembly.

14. The method of claim 10, wherein directing the off gas through a cooled charcoal column assembly includes directing the off gas through the cooled charcoal column assembly at a flow rate in the range of 1.2 normal liters per minute (NL/min) to 1.8 NL/min while the charcoal column assembly is at a temperature in the range of −5° C. to 10° C.

15. The method of claim 10, wherein directing the off gas through a cooled charcoal column assembly includes directing the off gas through the cooled charcoal column assembly at a flow velocity in the range of 5 centimeters per second (cm/s) to 10 cm/s while the charcoal column assembly is at a temperature in the range of −5° C. to 10° C.

16. The method of claim 10, wherein directing the carrier gas and the desorbed Xenon-133 through a cooled coil assembly includes directing the carrier gas and the desorbed Xenon-133 through the cooled coil assembly at a flow rate in the range of 140 normal-milliliters/minute (NmL/min) to 180 NmL/min while the coil assembly is at a temperature of less than −150° C.

17. The method of claim 13, wherein fluidly connecting the outlet of the coil assembly to the vacuum source includes fluidly connecting the outlet of the coil assembly to an evacuated container having a pressure in the range of 200 milliBar (mBar) to 350 mBar.

18. The method of claim 13, wherein fluidly connecting the outlet of the coil assembly to the vacuum source includes evacuating the coil assembly to a pressure less than 500 milliBar.

* * * * *